United States Patent
Velke et al.

(10) Patent No.: US 7,647,754 B2
(45) Date of Patent: Jan. 19, 2010

(54) WALK BEHIND LAWN MOWER CONTROL SYSTEM

(75) Inventors: James D. Velke, Germantown, MD (US); William R. Wright, Clarksburg, MD (US); Luke Waesche, Hagerstown, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 456 days.

(21) Appl. No.: 11/208,002

(22) Filed: Aug. 22, 2005

(65) Prior Publication Data

US 2007/0039301 A1    Feb. 22, 2007

(51) Int. Cl.
  *A01D 69/00* (2006.01)
(52) U.S. Cl. ....................................................... 56/10.8
(58) Field of Classification Search .................. 56/10.8, 56/11.2, 11.3, 11.7, 16.7; 180/6.2, 19.3, 180/315
  See application file for complete search history.

(56) References Cited

U.S. PATENT DOCUMENTS

| | | | | |
|---|---|---|---|---|
| 4,281,732 A * | 8/1981 | Hoch | | 180/19.3 |
| 4,920,733 A | 5/1990 | Berrios | | |
| 5,197,577 A * | 3/1993 | Hayek | | 188/265 |
| 5,251,429 A | 10/1993 | Minato et al. | | |
| 5,375,674 A * | 12/1994 | Peter | | 180/19.3 |
| 5,542,241 A * | 8/1996 | Lydy et al. | | 56/11.3 |
| 5,651,241 A * | 7/1997 | Wegner | | 56/11.2 |
| 5,816,033 A | 10/1998 | Busboom et al. | | |
| 5,822,961 A | 10/1998 | Busboom | | |
| 5,964,082 A | 10/1999 | Wright et al. | | |
| 6,138,446 A | 10/2000 | Velke et al. | | |
| 6,189,304 B1 | 2/2001 | Velke et al. | | |
| 6,276,486 B1 | 8/2001 | Velke et al. | | |
| 6,341,479 B1 * | 1/2002 | Scag et al. | | 56/11.3 |
| 6,390,225 B2 | 5/2002 | Velke et al. | | |
| 6,438,930 B1 | 8/2002 | Velke et al. | | |
| 6,438,931 B1 | 8/2002 | Velke et al. | | |
| 6,490,849 B1 | 12/2002 | Scag et al. | | |
| 6,560,952 B2 | 5/2003 | Velke et al. | | |
| 6,658,831 B2 | 12/2003 | Velke et al. | | |
| 6,688,089 B2 | 2/2004 | Velke et al. | | |
| 6,701,825 B1 | 3/2004 | Langenfeld | | |
| 6,782,797 B1 | 8/2004 | Brandenburg et al. | | |
| 6,912,831 B2 | 7/2005 | Velke et al. | | |
| 2001/0001170 A1 | 5/2001 | Velke et al. | | |
| 2002/0059788 A1 | 5/2002 | Velke et al. | | |
| 2002/0178709 A1 | 12/2002 | Velke et al. | | |
| 2003/0000190 A1 * | 1/2003 | Busboom et al. | | 56/10.8 |
| 2003/0192295 A1 * | 10/2003 | Busboom et al. | | 56/16.7 |
| 2004/0031629 A1 * | 2/2004 | Walker | | 180/6.48 |
| 2005/0011683 A1 * | 1/2005 | Walker | | 180/6.2 |
| 2005/0126146 A1 | 6/2005 | Velke et al. | | |

* cited by examiner

*Primary Examiner*—Árpád Fábián-Kovács
(74) *Attorney, Agent, or Firm*—Nixon & Vanderhye P.C.

(57) ABSTRACT

This invention relates to a lawn mower. In certain example embodiments, the lawn mower may be of the walk-behind type. In certain example embodiments of this invention, the lawn mower may have one or more of: (a) an improved handlebar weldment assembly, (b) an improved operator presence control (OPC) system and structure, (c) an improved speed control system structure, (d) an improve cam bar system for hydraulic pump control, (e) a return-to-neutral biasing system that biases hand lever(s) toward a neutral position but only from a reverse position (not from a forward position), and/or (f) an improved tracking adjustment system.

8 Claims, 23 Drawing Sheets

WALK BEHIND LAWN MOWER CONTROL SYSTEM

This invention relates to a lawn mower. In certain example embodiments, the lawn mower may be of the walk-behind type. In certain example embodiments of this invention, the lawn mower may have one or more of: (a) an improved handlebar weldment assembly, (b) an improved operator presence control (OPC) system and structure, (c) an improved speed control system structure, (d) an improve cam bar system for hydraulic pump control, (e) a return-to-neutral biasing system that biases hand lever(s) toward a neutral position but only from a reverse position (not from a forward position), and/or (f) an improved tracking adjustment system.

BACKGROUND OF THE INVENTION

Lawn mowers are known in the art. For example, example mowers are discussed in U.S. Pat. Nos. 6,138,446, 6,390,225, 6,688,089, 6,438,931, 6,189,304, 6,438,930, 6,658,831, 6,560,952, 2005/0126146, 4,920,733, 2001/0001170, 2002/0059788, 6,438,930, and 5,964,082, the disclosures of all of which are all hereby incorporated herein by reference.

FIG. 1 is a perspective view of a walk-behind self-propelled power mower, wherein an optional sulky 1 is being pulled behind the mower in a deployed position. The mower shown in FIG. 1 includes a cutter deck 3 for housing at least one cutting blade (now shown), an engine deck 5 for supporting a combustion engine 7 that powers the cutting bladed(s), first and second rear drive wheels 9 and 11, front pivotal castors 13, deck cover 15 for covering pulley systems and belt(s) which couple mechanical energy from the engine 7 to drive the blade(s), gas tank 19, gas tank support structure 21, battery 23 on battery support 25, support bar 27 extending between first and second vertical members 29 of the tractor frame, parking brake lever 31 which when pulled causes braking force to be applied to at least rear drive wheel 9 via brake shoe 33, handle control assembly 35 including rigid member 37 having both a right-hand rigid member 39 and a left-hand rigid member 41 that are fixedly connected to one another via connector 40, right forward control lever 43, right reverse control lever 45, left forward control lever 47, and left reverse control lever 49 (the right forward and reverse control levers 43 and 45 are rigidly connected to one another and pivot together relative to fixed or rigid member 39; whereas the left forward and reverse control levers 47 and 49 are rigidly connected to one another and pivot together relative to fixed or rigid member 41), support assembly 51 including a pair of support members extending upwardly at an angle from engine deck 5 so as to support the handle control assembly, dashboard 53, X-brace 55 for providing support between the support members 51, first and second hydraulic (or hydrostatic/hydro) pumps 57 and 59 for driving and controlling the driving direction of the first and second drive wheels 9 and 11 respectively, via respective wheel motors, right control rod 61 operatively coupled between the right handle control member(s) and the right pump 57, left control rod 63 operatively coupled between the left handle control member(s) and the left pump 59 so as to allow the handle control members to control operation of the pumps and thus the rear drive wheels 9, 11, and latch assembly 65 adapted to receive part of the sulky 1 thereby allowing the sulky to be stored in a stowed position during transport and the like.

In certain example embodiments of this invention, the mower is a zero-turning radius type walk-behind mower. Example zero radius turning mowers are described in each of U.S. Pat. Nos. 4,920,733, 5,964,082, 5,984,031, and 6,550,563, the disclosures of which are hereby incorporated herein by reference. A zero turning radius mower typically includes first and second drive wheels 9 and 11, each of which is independently drivable in both forward and reverse directions. The two drive wheels 9 and 11 may be provided along a common horizontal axis (but not axle) in certain example instances. To perform a zero radius turn, the first rear drive wheel is driven in the forward direction and the second rear drive wheel is driven in the rearward direction at the same time, thereby causing the mower to conduct a zero radius turn about a vertical axis that is located between the rear drive wheels. Each rear drive wheel (9 or 11) of a zero turning radius mower may be driven by its own hydraulic (or hydrostatic) pump (57 or 59), so that one pump is provided for each drive wheel.

While the mower of FIG. 1 is advantageous and an excellent mower, it may be subject to improvement in certain respect(s).

BRIEF SUMMARY OF EXAMPLE EMBODIMENTS OF THE INVENTION

This invention relates to a lawn mower. In certain example embodiments, the lawn mower may be of the walk-behind type. In certain example embodiments of this invention, the lawn mower may have one or more of: (a) an improved handlebar weldment assembly, (b) an improved operator presence control (OPC) system and structure, (c) an improved speed control system structure, (d) an improve cam bar system for hydraulic pump control, (e) a return-to-neutral biasing system that biases hand lever(s) toward a neutral position but only from a reverse position (not from a forward position), and/or (f) an improved tracking adjustment system.

In certain example embodiments of this invention, there is provided a lawn mower comprising: an engine for driving at least one cutting blade; a handle bar assembly including at least two spaced apart handles for an operator to grip during operation of the mower; an operator presence control (OPC) system including a right-hand lever and a left-hand lever, wherein the OPC system allows the mower to cut grass when a hand-grip portion of the right and/or left hand lever is pressed against a handle(s) of the mower, but causes the mower to stop cutting grass when the hand-grip portions of the right and left-hand levers are not pressed against the handles of the mower; and wherein the right and left hand levers of the OPC system are made separately and are connected together by at least one bracket under a dash of the mower.

In other example embodiments of this invention, there is provided a walk-behind lawn mower comprising: a combustion engine for driving at least one cutting blade for cutting grass; at least one pump for controlling speed and direction of at least one drive wheel of the walk-behind lawn mower; and a speed control system for allowing an operator to control speed of the mower, the speed control system including a hand lever at a dashboard area of the mower and wherein speed of the mower can be adjusted when an operator of the mower moves the hand lever, and wherein the hand lever is operatively connected to a member having an arc-shaped toothed surface that rotates about an axis as the hand lever is moved, and wherein a roller and/or bearing member is spring-biased into engagement with the arc-shaped toothed surface so as to maintain the arc-shaped toothed surface and the hand lever in a given position when an operator is not applying sufficient force to the hand lever.

In still further example embodiments of this invention, there is provided a lawn mower comprising: an engine for driving at least one cutting blade for cutting grass; at least one pump for controlling speed and direction of at least one drive wheel of the mower; and a speed limiting system for limiting a maximum speed at which at least one drive wheel of the mower may be driven, the speed limiting system including a bar supporting at least one cam, wherein the cam engages a roller and/or bearing supported by at least a pump control lever of the pump so that a position of the cam can limit the amount of movement of the pump control lever in a particular direction.

In other example embodiments of this invention, there is provided a lawn mower comprising: an engine for driving at least one cutting blade for cutting grass; first and second hydraulic pumps for controlling speed and direction of corresponding first and second drive wheels of the mower; and a tracking adjustment system for allowing an operator to adjust a maximum forward speed of at least one of the drive wheels relative to the other drive wheel, the tracking adjustment system including a pump control lever attached to the first pump, a bracket pivotally attached to the pump control lever via a pivot axis, where a first portion of the bracket on one side of the pivot axis supports a roller/bearing adapted to be biased toward a cam and a second portion of the bracket on the other side of the pivot axis engages with a threaded shaft whose adjustment permits the position of the bracket and roller/bearing to be adjusted relative to the pump control lever thereby permitting tracking adjustments to be made.

In other example embodiments of this invention, there is provided a pistol-grip type walk-behind lawn mower comprising: an engine for driving at least one cutting blade for cutting grass; first and second hydraulic pumps for controlling speed and direction of corresponding first and second drive wheels of the walk-behind mower; pistol grip levers for controlling operation of the pumps, the pistol grip levers being adapted to be squeezed by hands of an operator toward respective handle grips of the mower; and at least one of the pumps being provided with first and second return-to-neutral arms that rotate about a common axis, and a spring provided between at least the first and second return-to-neutral arms, and wherein the spring biases the pump to return to a neutral state when the pump is in a reverse state but not when the pump is in a forward state.

DETAILED DESCRIPTION OF EXAMPLE EMBODIMENTS OF THE INVENTION

Figure 1:
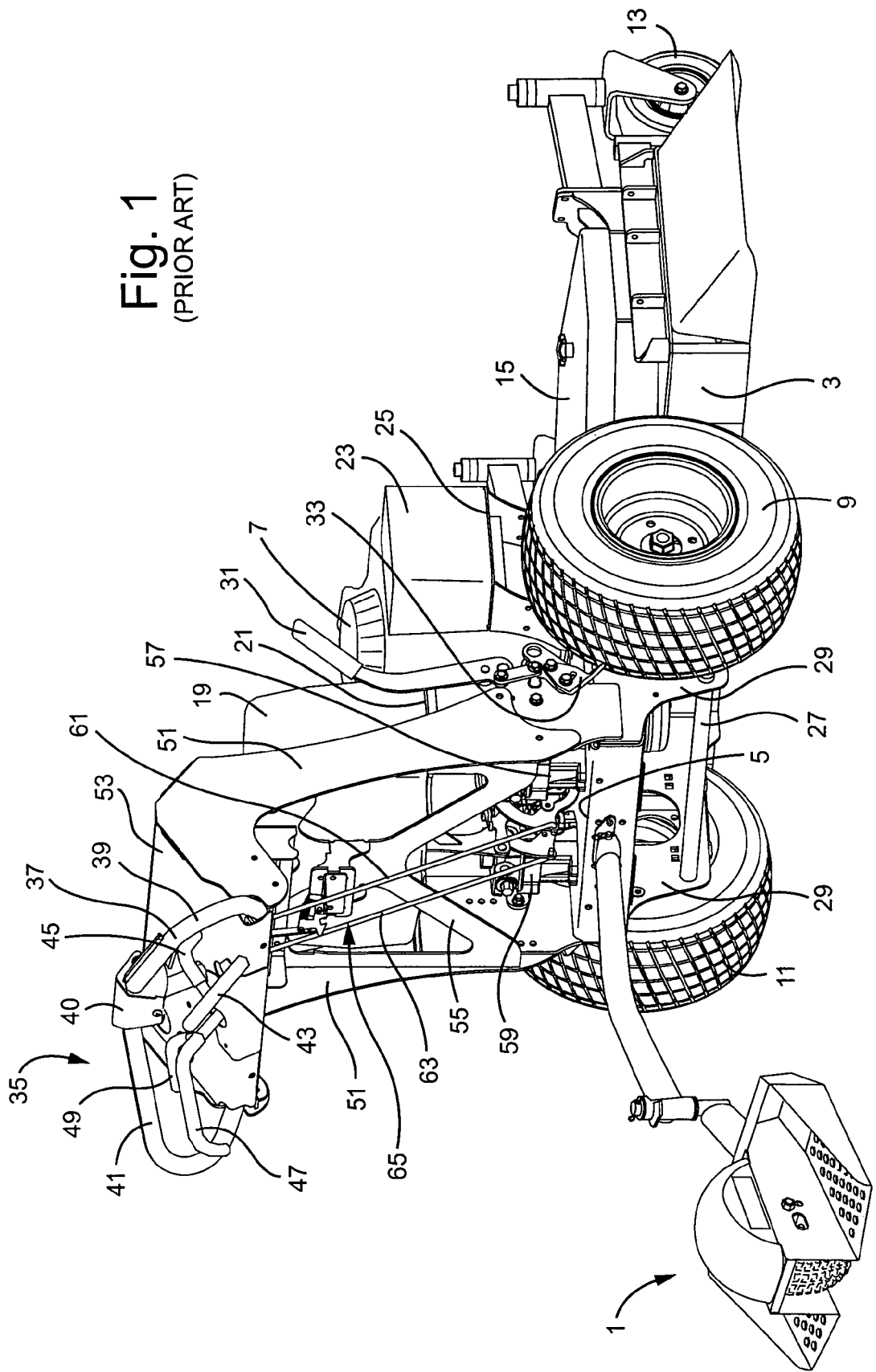
FIG. 1 is a perspective view of a conventional walk-behind lawn mower.

Referring now more particularly to the accompanying drawings in which like reference numerals indicate like parts throughout the several views. It is noted that mowers according to certain example embodiments of this invention may be the same as the mower discussed above in the background except for the differences shown in the drawings discussed below and the differences described herein.

Figure 2A:
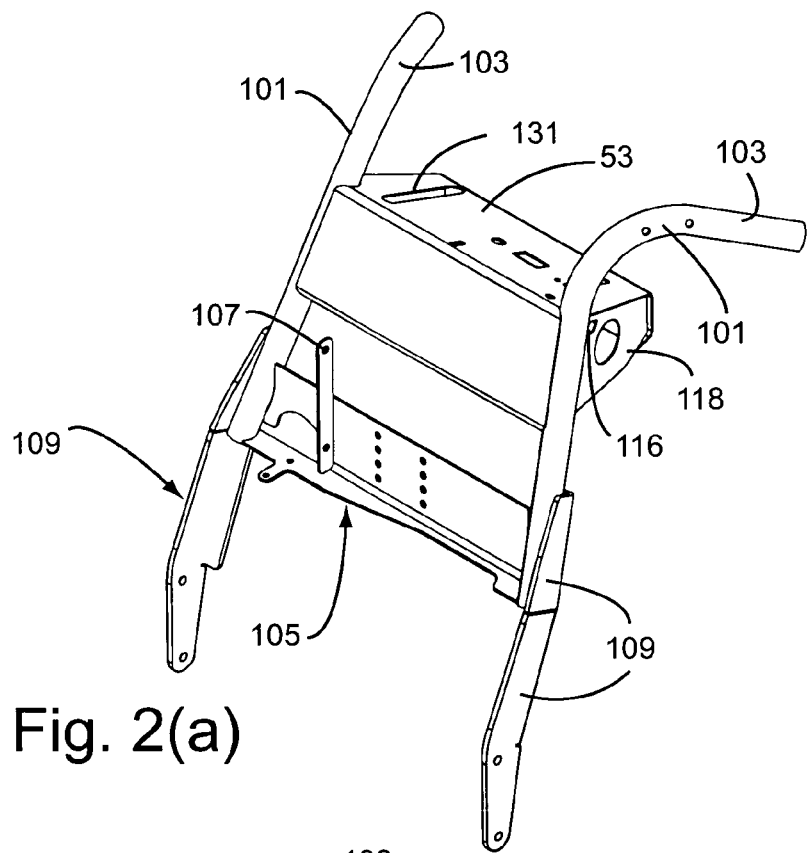
FIGS. 2(a), 2(b) and 2(c) are different views of a handle bar weldment structure for a walk-behind lawn mower according to an example embodiment of this invention.
Figure 2B:
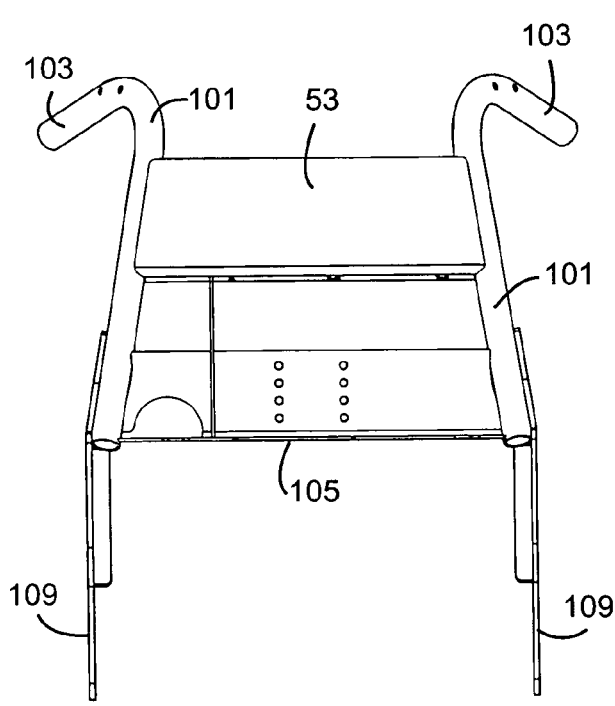
Figure 2C:
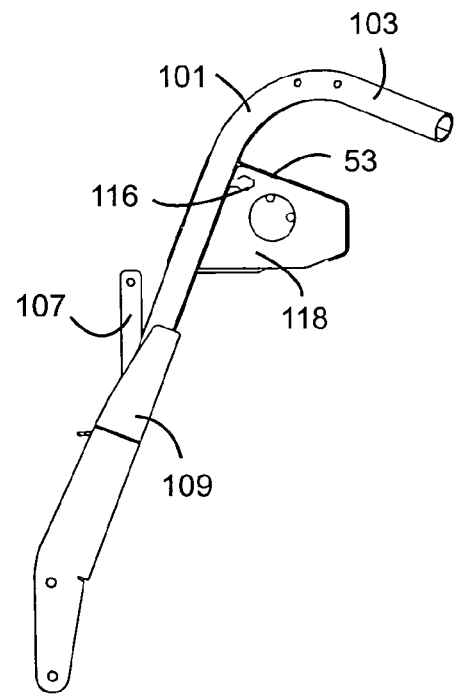

FIGS. 2(a), 2(b) and 2(c) are different views of a handle bar weldment structure for a walk-behind lawn mower according to an example embodiment of this invention. FIG. 2(a) is a perspective view of the handle bar weldment, FIG. 2(b) is a from plan view of the handle bar weldment as viewed from a front of the mower, and FIG. 2(c) is a side plan view of the weldment as viewed from the port side of the mower. The term "weldment" as used herein means that the components are welded or otherwise connected (e.g., welded, bolted, screwed, and/or glued), directly or indirectly, so as to form a unitary fairly rigid structure (i.e., components of a "weldment" do not pivot with respect to each other). The handle bar weldment shown in FIGS. 2(a)-2(c) is for a pistol-grip type of walk-behind lawn mower and includes tubular handle bars 101 that are approximately L-shaped, hand-grip portions 103 of the handle bars 101 adapted to be gripped by an operator during use of the walk-behind mower, dash or dashboard 53 extending between and connected to the tubular handle bars 101, crossbrace 105 extending between and attached to the two tubular handle bars 101, flange 107 supported by crossbrace 105 for mounting a hydraulic fluid tank 107a (not shown in FIG. 2) and an optional sulky latch assembly (not shown), and metal plates 109 that support the tubular handle bars 101 since the tubular handle bars 101 are attached to the respective metal plates 109 by welding, bolts or the like. The bottom portions of the metal plates 109 are connected to the tractor frame of the mower (not shown in FIG. 2). It is advantageous to use a combination of metal plates 109 (at a lower portion of the handle bar assembly) and the tubular handle bars 101 (at an upper portion of the handle bar assembly), which are connected to each other, as this provides improved support and strength compared to a situation where the tubular members extended all the way to the tractor frame of the mower. This is also advantageous in that only one bend per tube is needed, which makes it easier to make the mower.

Figure 3:
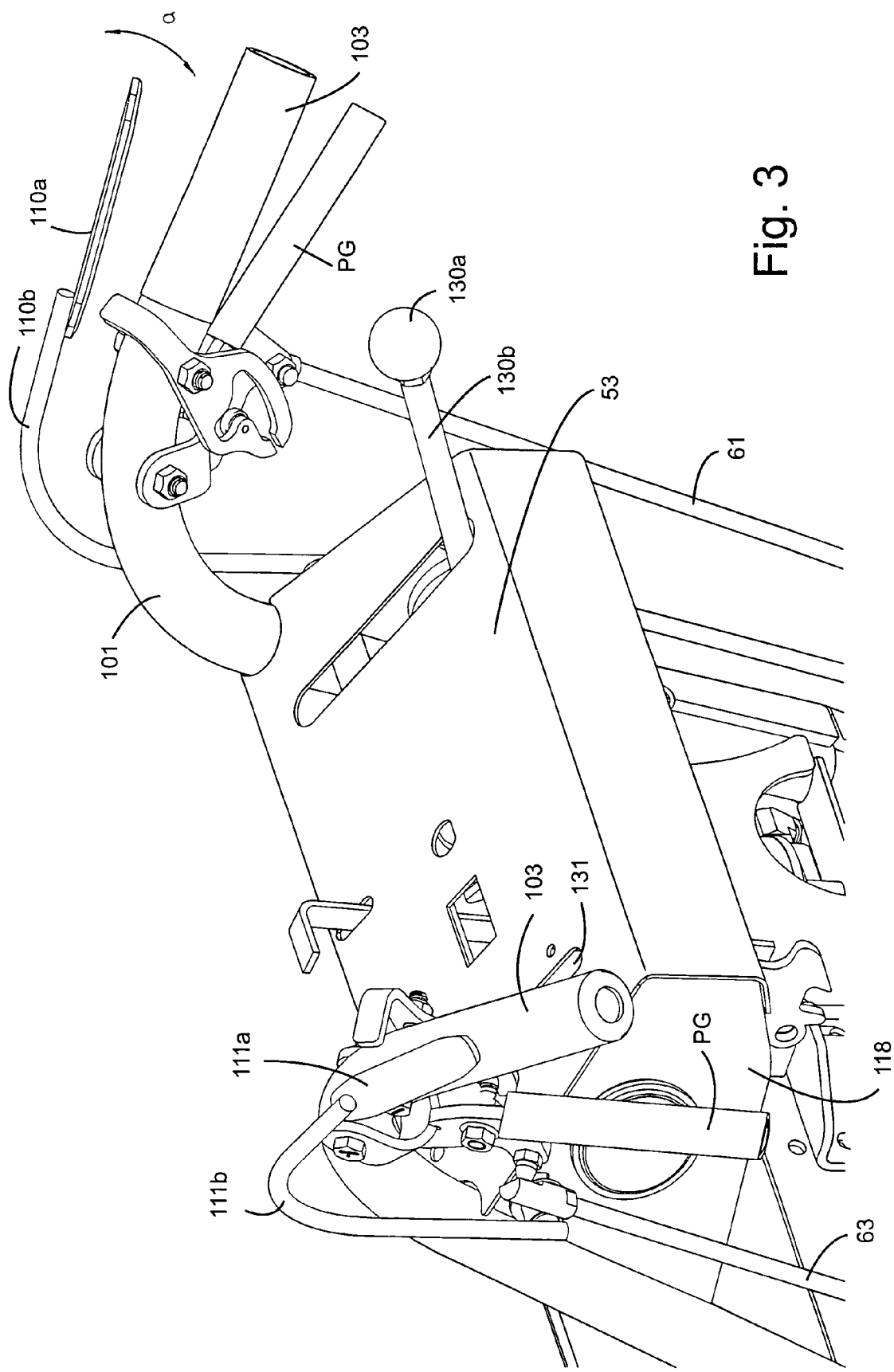
FIG. 3 is a perspective view of a dashboard area of a walk behind mower according to an example embodiment of this invention, including parts of an improved OPC system and structure.
Figure 4:
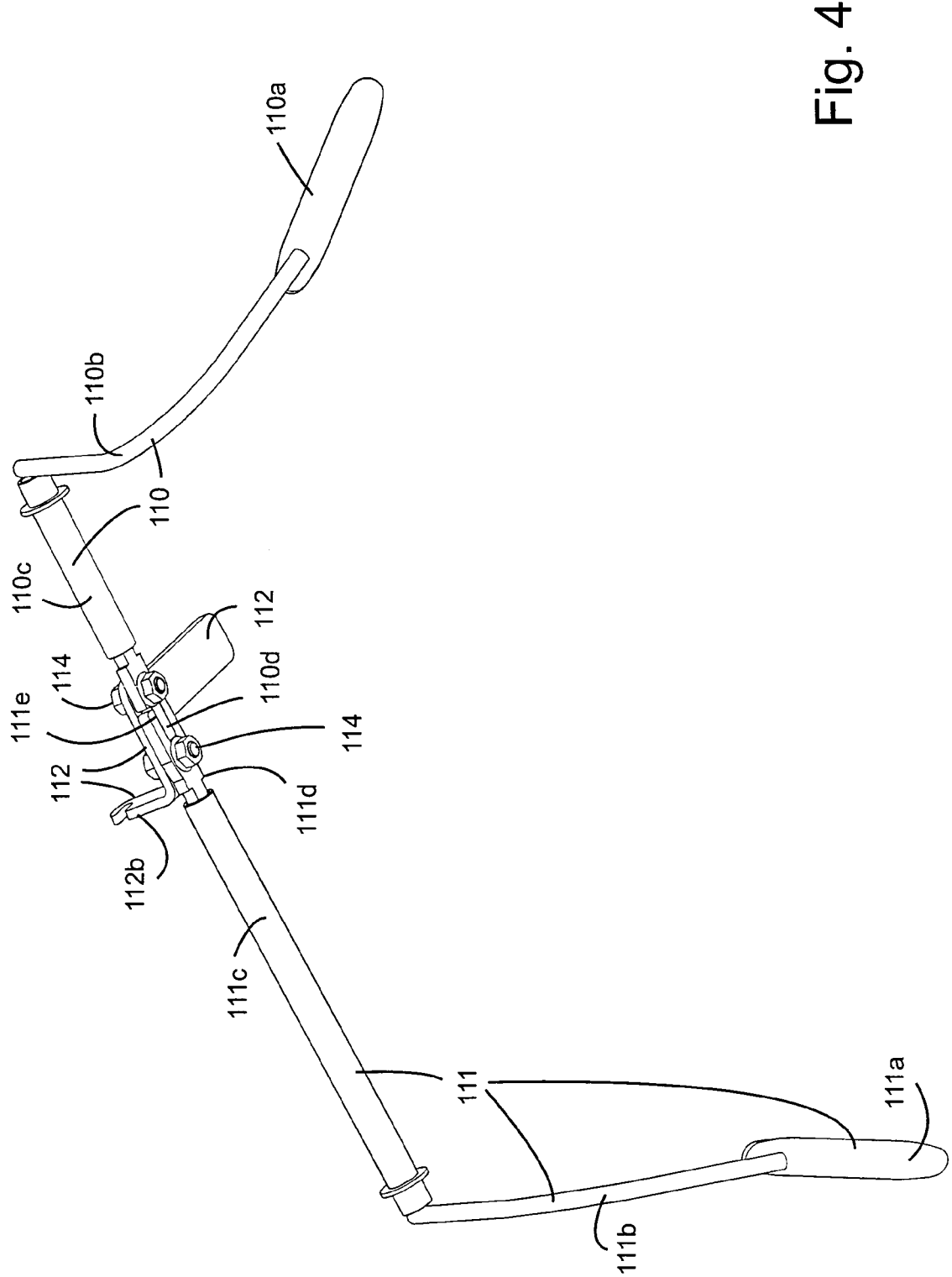
FIG. 4 is a perspective view of the OPC handle weldment system that is used in the OPC system and structure of FIG. 3.
Figure 5:
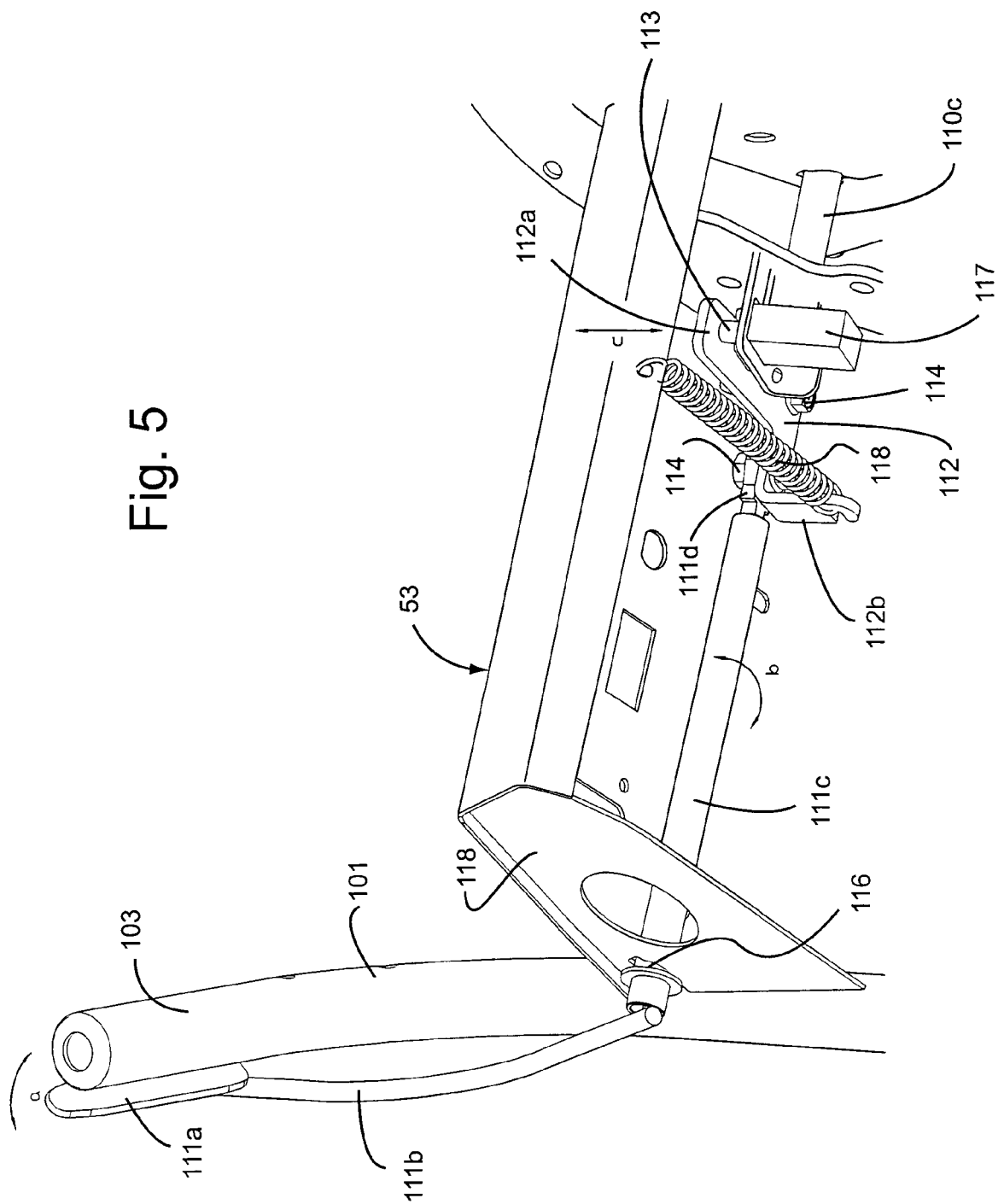
FIG. 5 is a perspective view of the dashboard area of the walk behind mower of FIGS. 2-4, viewed from a position behind the handlebars and from under the dashboard.
Figure 6:
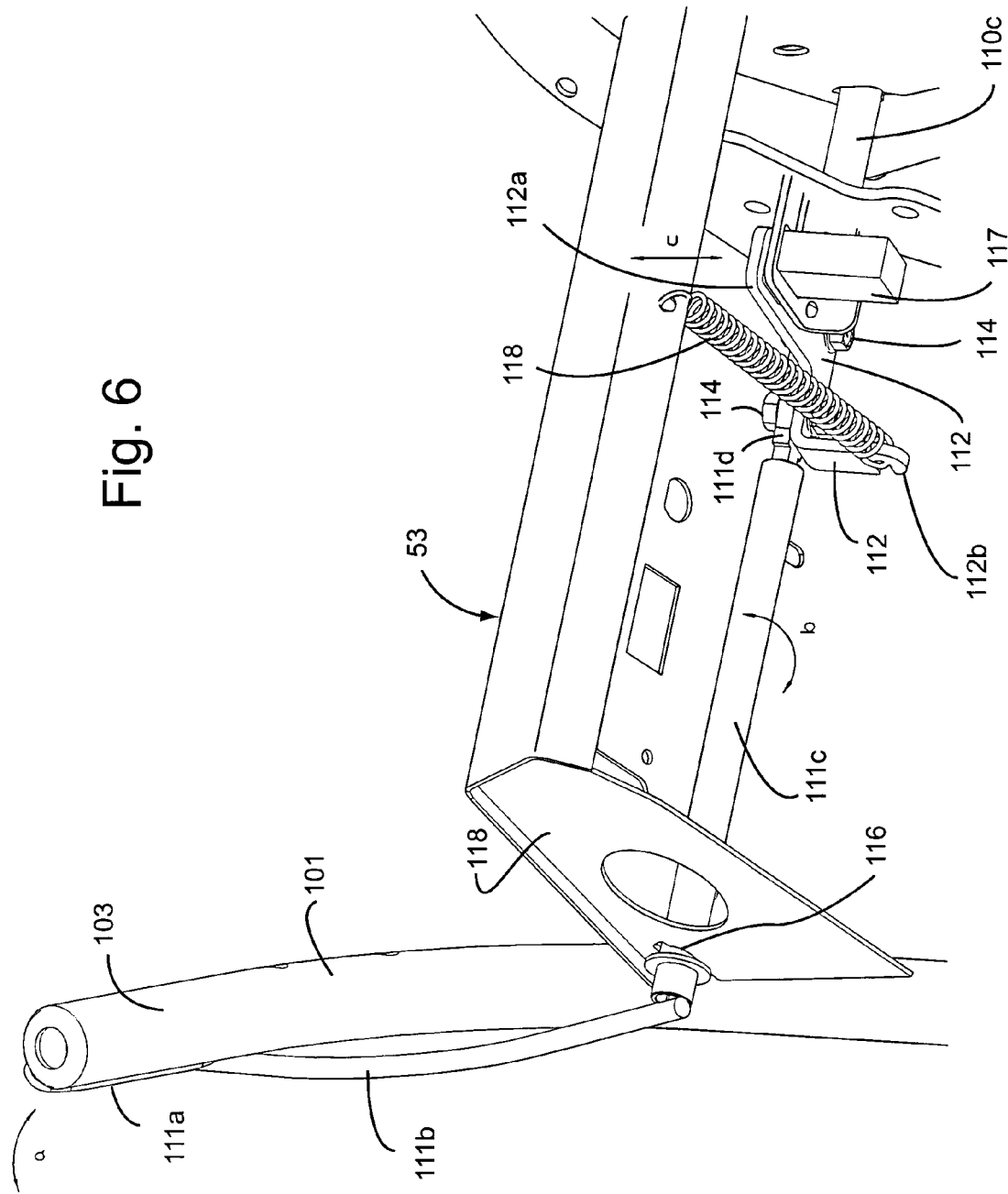
FIG. 6 is a perspective view of the dashboard area of the walk behind mower of FIGS. 2-5, viewed from a position behind the handlebars and from under the dashboard, this figure illustrating the OPC switch in a different position than in FIG. 5.
Figure 7:
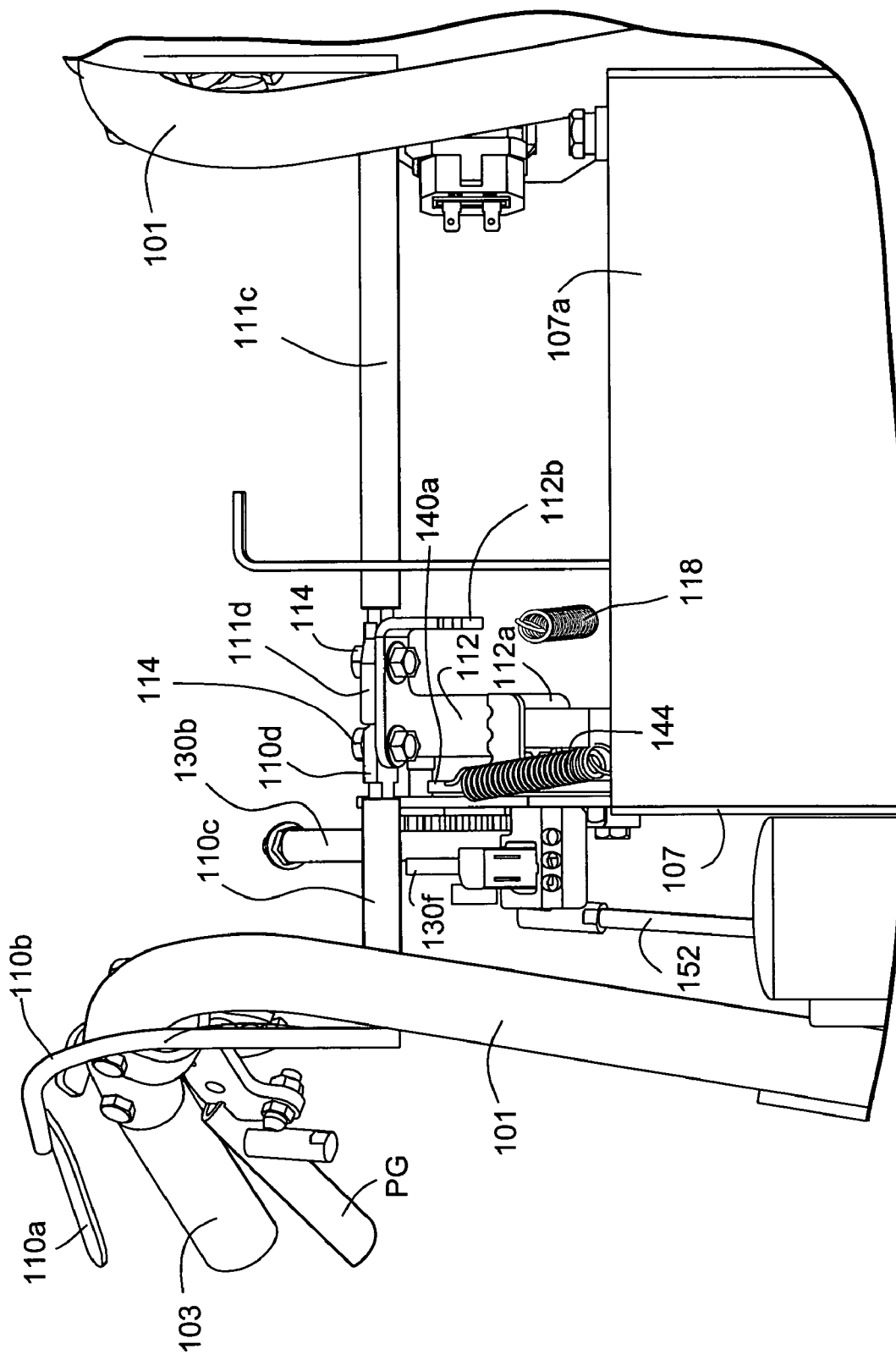
FIG. 7 is a perspective view of the OPC system and structure of the walk behind mower of FIGS. 2-6, viewed from in front of the handle bars; the dashboard itself is not shown in FIG. 7 for purposes of simplicity so that other components may more easily be seen (note that in operation spring 118 in FIG. 7 should be connected to 112b, but is not shown in this manner in this figure for purposes of simplicity).
Figure 8:
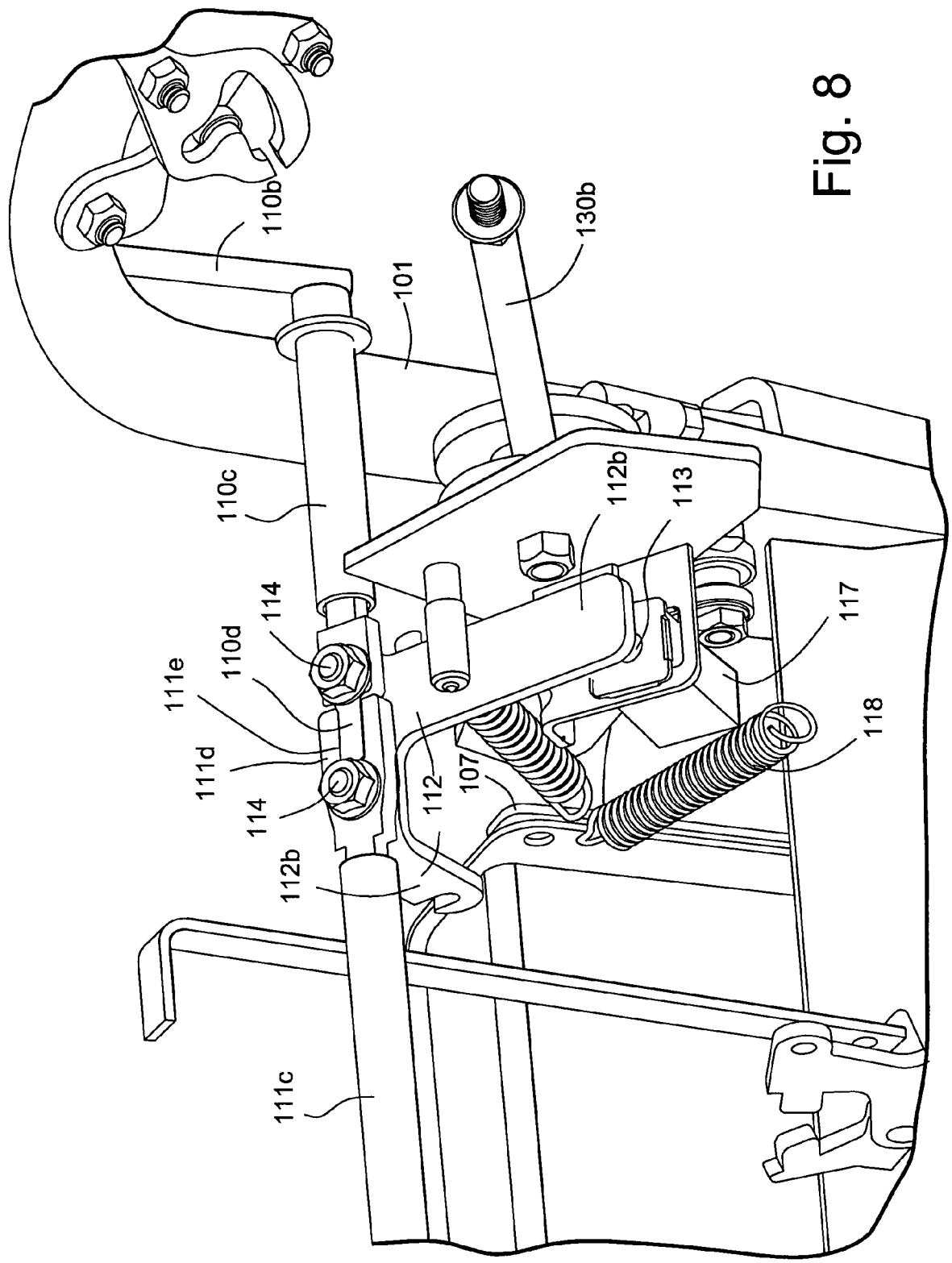
FIG. 8 is a perspective view of the OPC system and structure of the walk behind mower of FIGS. 2-7, viewed from behind the handle bars; the dashboard itself is not shown in FIG. 8 for purposes of simplicity so that other components may more easily be seen (note that in operation spring 118 in FIG. 8 should be connected to 112b, but is not shown in this manner in this figure for purposes of simplicity).

FIGS. 3-8 illustrate an improved operator presence control (OPC) system and structure that may be used in the mower according to an example embodiment of this invention. FIG. 3 is a perspective view of a dashboard area of a walk behind mower according to an example embodiment of this invention, including parts of an improved OPC system and structure. FIG. 4 is a perspective view of the OPC handle weldment system that is used in the OPC system and structure, and FIGS. 5-6 are perspective views of the dashboard area viewed from a position behind the handlebars and from under the dashboard, with the OPC switching being in different positions in FIGS. 5 and 6. FIGS. 7 and 8 are perspective views of the OPC system and structure of the walk behind mower of FIGS. 2-8, from different viewpoints, and wherein the dash 53 is not shown in FIGS. 7 and 8 for purposes of simplicity so that other components may more easily be seen.

Referring to FIGS. 3-8, the OPC system and structure includes a right-hand OPC lever 110 and a left-hand OPC lever 111 that are connected via connection bracket 112. The right-hand OPC lever 110 includes a hand-grip portion 110a adapted to be touched by the right hand of the mower operator during operation of the mower, a curved and/or approximately L-shaped portion 110b which may be formed of a bent rod or the like, and elongated and/or linear portion 110c adapted to be oriented approximately parallel to the ground during mower operation (this portion 110c may include a metal member covered with a tube or the like in certain example embodiments). Components 110a, 110b, 110c and 110d of the right-hand OPC lever 110 are all connected, directly or indirectly, and thus move (e.g., pivot and/or rotate) together in unison. In a similar manner, the left-hand OPC lever 111 includes a hand-grip portion 111a adapted to be touched by the left hand of the mower operator during operation of the mower, a curved and/or approximately L-shaped portion 111b which may be formed of a bent rod or the like, and elongated and/or linear portion 111c adapted to be oriented approximately parallel to the ground during mower operation (this portion 111c may include a metal member covered with a tube or the like in certain example embodiments). Components 111a, 111b, 111c and 111d of the left-hand OPC lever 111 are all connected, directly or indirectly, and thus move (e.g., pivot and/or rotate) together in unison. In certain example embodiments, linear portions 110c and 111c of the right and left-hand OPC levers are approximately coaxial with one another and may abut at end portions thereof.

As best shown in FIGS. 4 and 8, one of the OPC levers (110 or 111) has a male portion at an end thereof, and the other a female portion at an end thereof. In the example embodiment of FIGS. 4-8, right-hand OPC lever 110 has a male portion 110d at an end portion thereof, and left-hand OPC lever 111 has a female portion 111d at an end thereof for mating with male portion 110d of the other lever. The female portion 111d of lever 111 has a recess (e.g., channel, hollow, hole, cut-out, or indent) 111e that receives a protrusion of the male portion 110d of the lever 110 as best shown in FIGS. 4 and 8. In addition to the protrusion of the male portion 110d fitting into the recess 111e of the female portion 111d, the male portion 110d and female portion 111d are also each attached (e.g., bolted or screwed to) to connection bracket 112 (e.g., see bolts 114). Thus, the OPC levers 110 and 111 are connected to each other both via the male/female engagement and via the bolts 114 by way of bracket 112. The male/female engagement functions to solidify the connection between the levers 110 and 111.

In certain example embodiments of this invention, the male 110d and female 111d portions of the levers are sized so as to be able to fit through respective apertures 116 defined in each of the sidewalls 118 of the dash 53. This is advantageous in making it easier and more efficient to manufacture the mower of FIGS. 2-8. In the manufacturing process, the male 110d and female 111d portions of the OPC levers (along with portions 110c and 111c) are fed through apertures 116 in the respective dash sidewalls 118 and the male/female engagement is realized when the levers abut one another. Then, after male portion 110d has engaged with female portion 111d, the bracket 112 is positioned adjacent the levers and bolts 114 are used to attach each of the levers 110 and 111 to the bracket 112 thereby solidifying the connection between the levers 110 and 111 under the dashboard of the mower. Moreover, the prongs of female portion 111d function to prevent the male portion 110d of the other lever from pivoting relative to bolts 114, thereby achieving a more efficient coupling/alignment of the left and right levers. Accordingly, the components 110a, 110b, 100c, 110d of the right-hand OPC lever 110, and components 111a, 111b, 111c, 111d and 111e of the left-hand OPC lever 111 are all connected, directly or indirectly, and thus move (e.g., pivot and/or rotate) together in unison during operation of the mower. In particular, the levers 111 and 110 rotate or pivot in unison about an axis defined along the length of portions 110*c* and 111*c* (see rotation direction "b" in FIGS. 5-6).

In operation of the mower, when an operator is operating the mower and wishes the mower to maintain its operation (i.e., keep cutting grass), the operator holds his/her hands down over hand-grip portions 110*a* and 111*a* so that the hand-grip portions are pressed downward against the handles 103 as shown in FIG. 6. In this position, the OPC switch 117 is on thereby permitting the mower to keep running and cutting grass (i.e., the blades keep running). When the hand-grip portions 110*a* and 111*a* of the OPC levers are in this position, the actuator portion 112*a* of the bracket 112 is pressing on button 113 of the OPC switch 117 thereby keeping the OPC switch "on." However, if the operator lets go of the handles 103, then spring 118 causes the hand-grip portions 110*a* and 111*a* of the OPC levers to move from the FIG. 6 position to the position shown in FIGS. 3, 5 and 7 where the end portions of the hand-grip portions 110*a* and 111*a* are spaced apart from the handles 103 of the mower thereby causing actuator portion 112*a* to pivot upward away from the OPC switch 117 so that button 113 moves far enough (in direction "c" shown in FIGS. 5-6) so that the switch 117 turns "off." Spring 118 may be connected between the dashboard (or some other structure) and portion 112*b* so as to bias portion 112*b* of bracket 112 downward and/or rearward (e.g., see FIGS. 5-6, and note that the spring 118 is shown in a disengaged position in FIGS. 7-8). In particular, spring 118 biases portion 112*b* of bracket 112 backward (to pivot in a counterclockwise direction about the pivot axis defined by 110*c* and 111*c* when viewed from the port side of the mower) thereby causing the levers to rotate about this axis and causing the hand-grip portions 110*a* and 111*a* to disengage from the handles 103 of the mower when no one is holding the hand-grip portions 110*a* and 111*a* down against the handles 103. Thus, spring 118 biases the OPC lever into a switch off position. When OPC switch 117 turns off in such a manner, this causes the blades and/or engine of the mower to turn off for safety purposes. In a similar manner, when the operator presses his/her hands down over hand-grip portions 110*a* and 111*a* so that the hand-grip portions are pressed downward against the handles 103 to the position shown in FIG. 6, the OPC levers 110 and 111 rotate about the axis defined by 110*c* and 111*c* (in a clockwise direction as viewed from the port side of the mower) against the biasing force of extension spring 118 thereby causing the actuator portion 112*a* of bracket 112 to press down on button 113 so that the OPC switch is turned on and the mower can run and cut grass. The OPC switch 117 is electrically connected to the engine of the mower so that the engine can be shut off by the OPC switch when the switch switches from an on state to an off state. OPC switch 117 may be a double contact plunger type OPC switch in certain example embodiments of this invention, and the on/off relationship may be inverted in certain example embodiments of this invention.

Accordingly, an improved OPC-pivot/bolt-up and switch paddle (see paddles 110*d* and 111*d*) integration system is provided. The two OPC levers 110 and 111 bolted together in an approximately central position under the dash of the mower. One can manufacture both levers 110 and 111, feed parts of the levers through respective holes 116 in sidewalls of the dash or some other vertically aligned weldment, and bolt the levers together under the dash. Bracket 112, made of one or multiple pieces, helps connect the two levers together via the bolts, causes the OPC switch to be actuated, and holds one end of the spring 118. Moreover, the male/female portions (or tabs or paddles 110*d* and 111*d*) are small enough to fit through the holes 116 in the upright weldments; this aids in manufacturability and self-alignment. Putting a single shaft all the way through both holes 118 is disadvantageous in that such a structure tends to be loose and wiggle too much.

Figure 9:
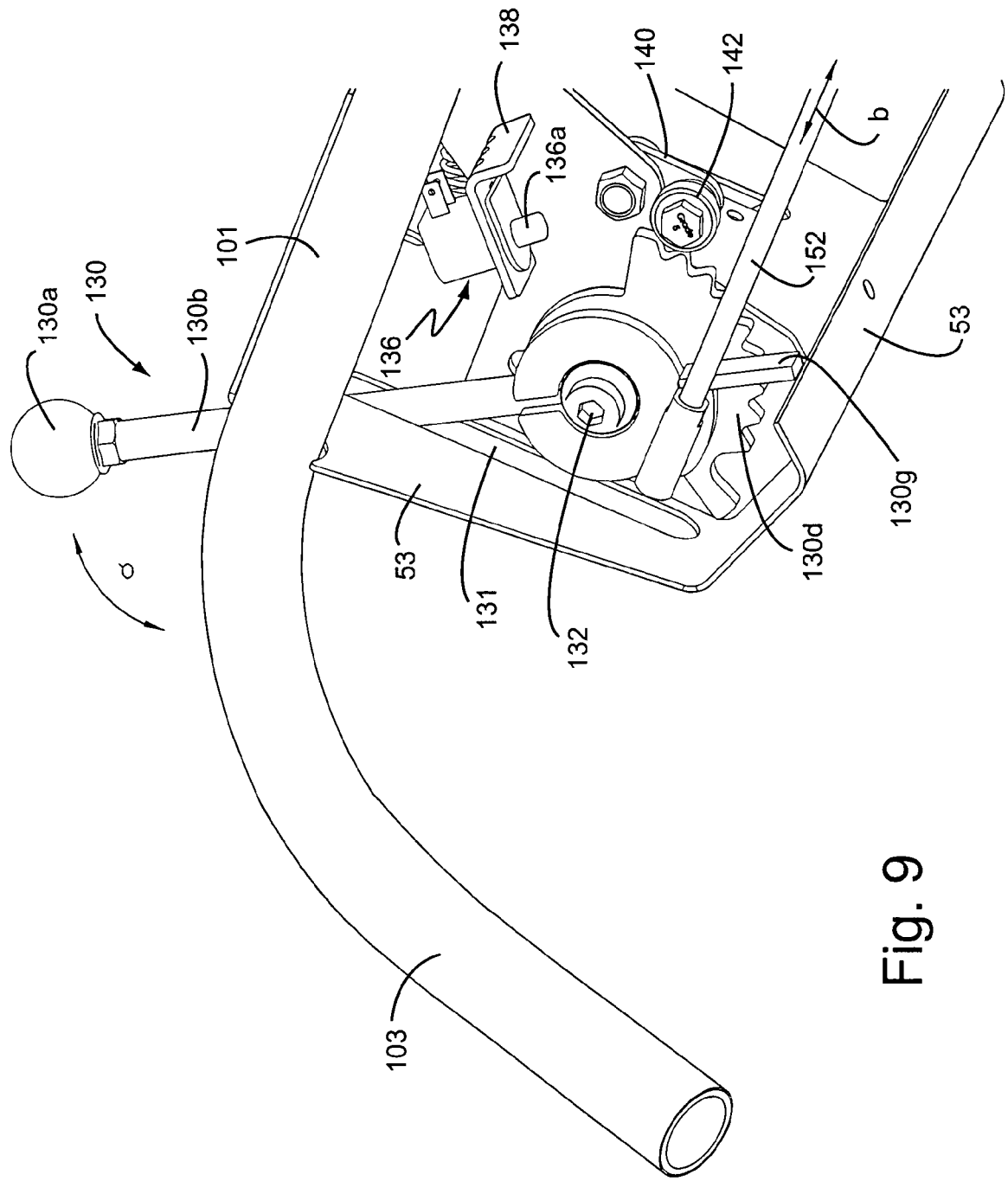
FIG. 9 is a perspective view of a speed control system of an example embodiment of this invention, in connection with the mower of FIGS. 2-8.
Figure 10:
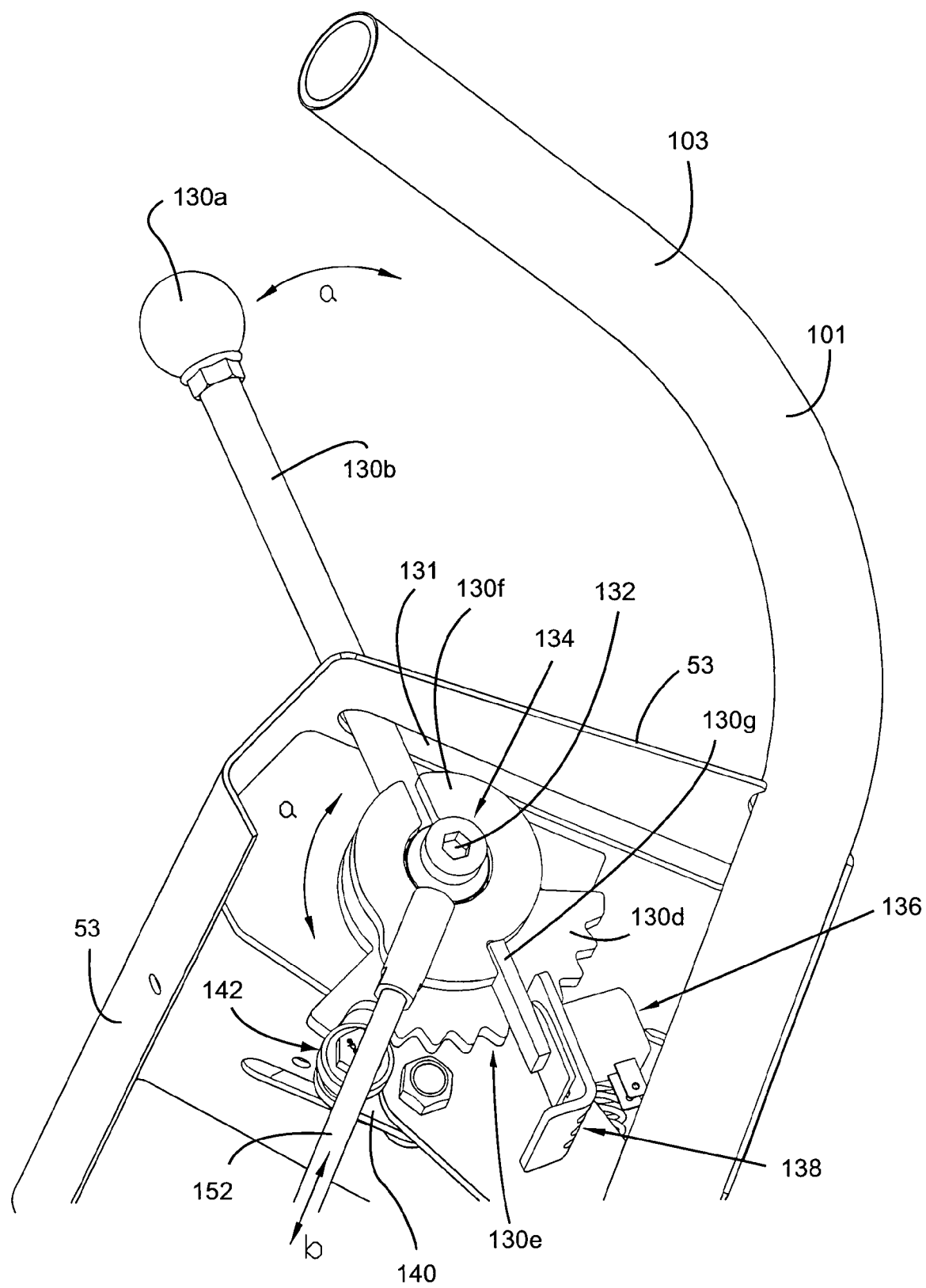
FIG. 10 is a perspective view of a speed control system of an example embodiment of this invention (the handle is in a different position than in FIG. 9), in connection with the mower of FIGS. 2-9.
Figure 11:
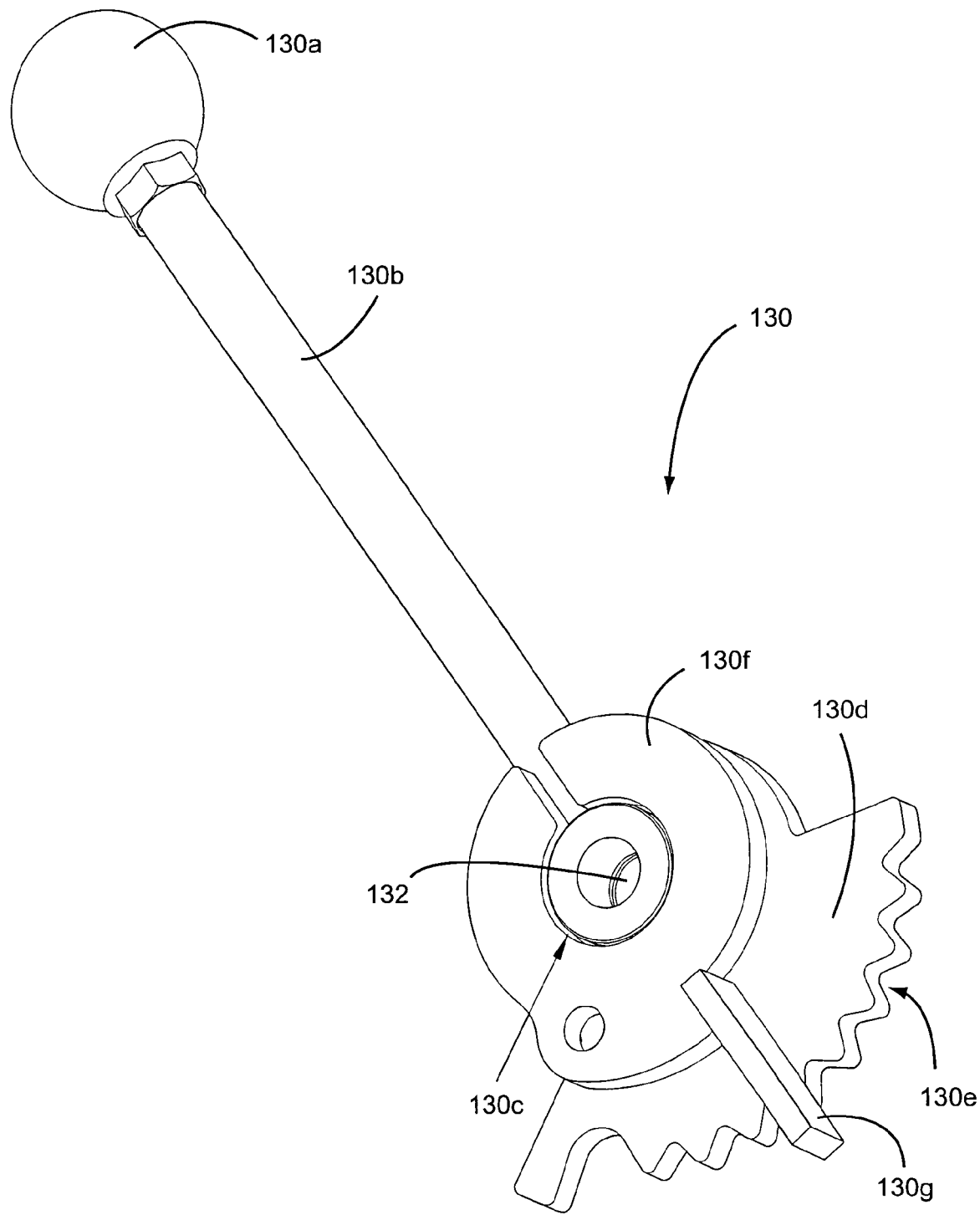
FIG. 11 is a perspective view of the lever used in the speed control system of FIGS. 9-10.
Figure 12:
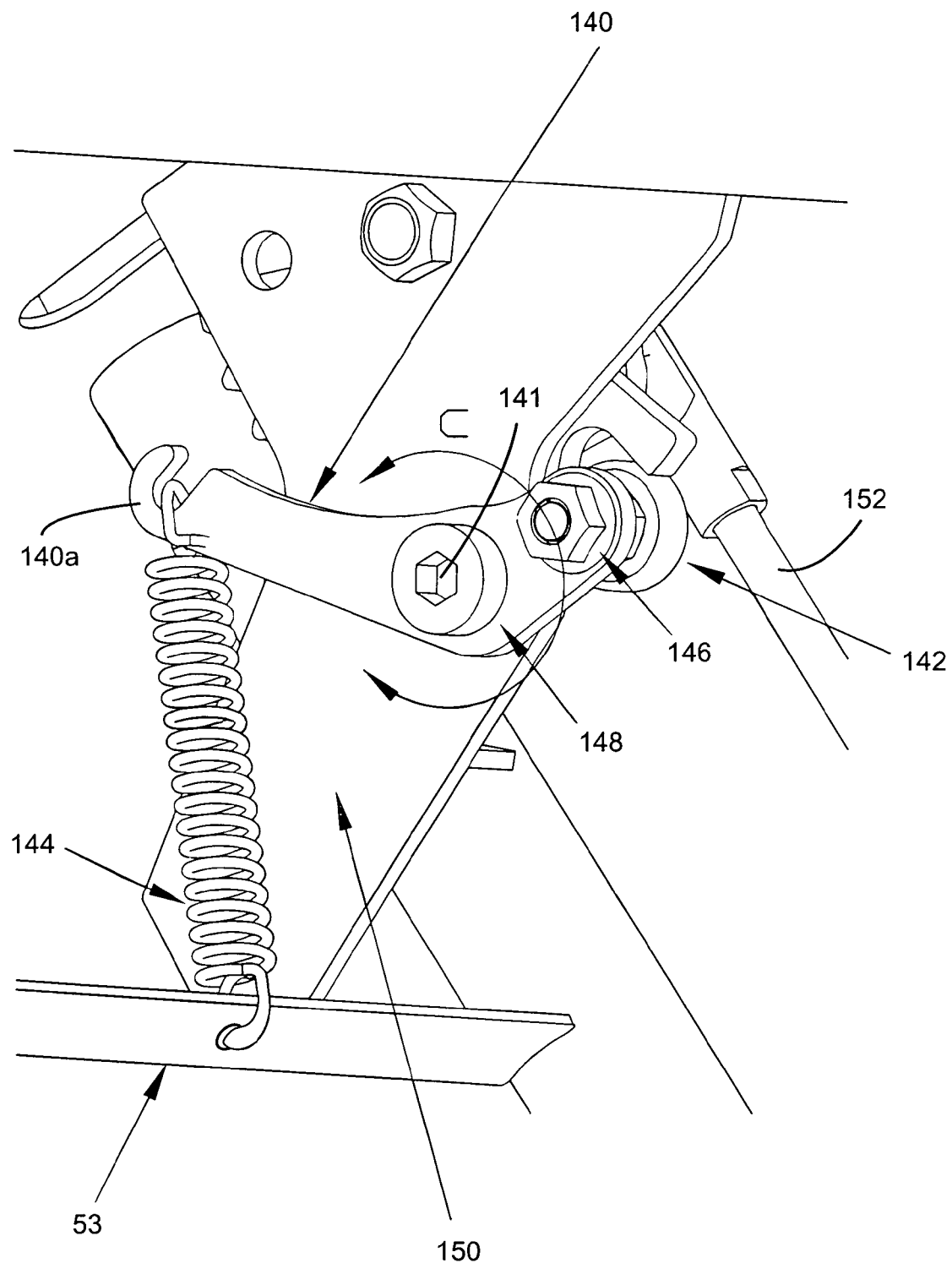
FIG. 12 is a perspective view of part of the speed control system of FIGS. 9-11.
Figure 13:
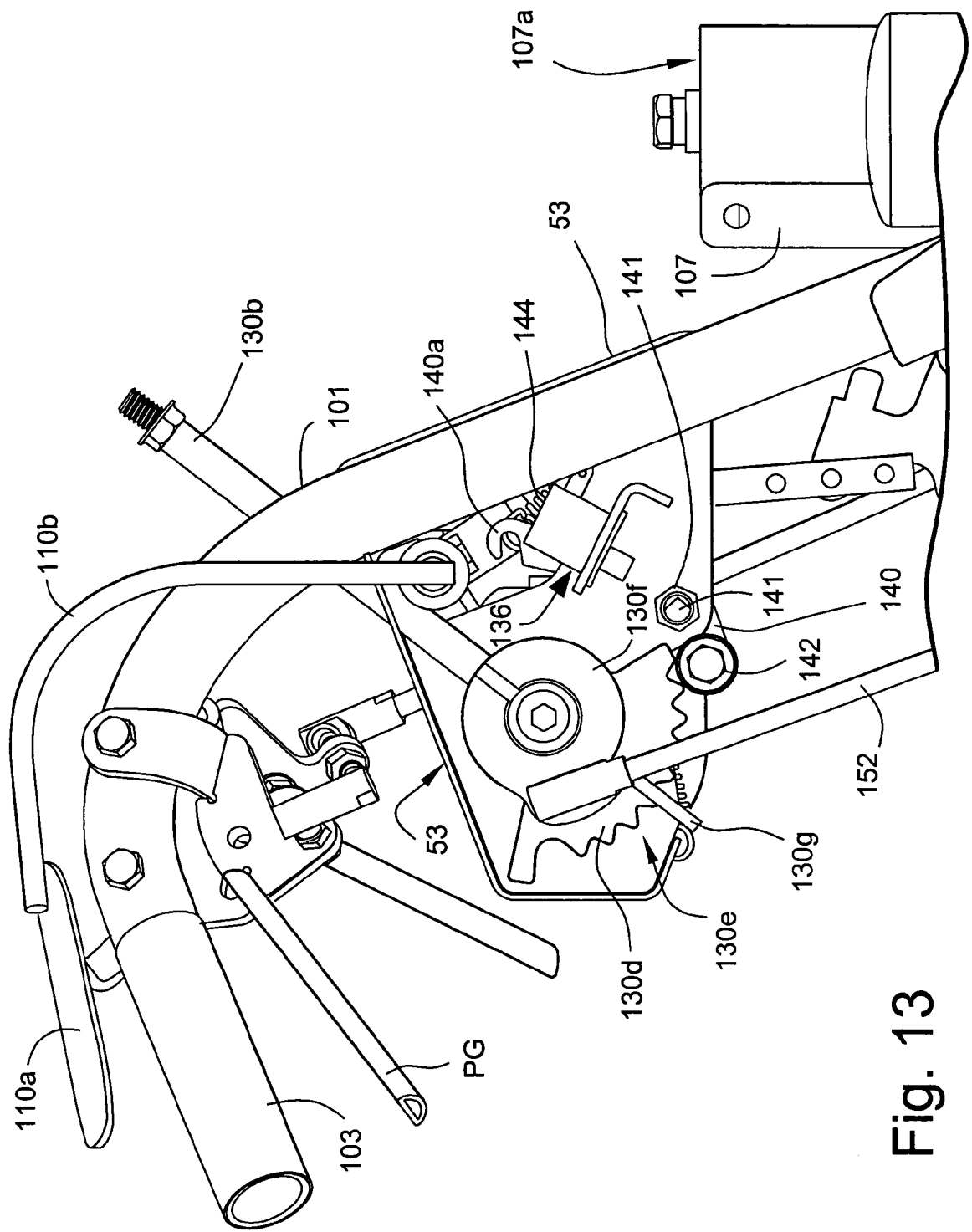
FIG. 13 is a side plan, partially transparent, view from the starboard side of the mower of the speed control system of FIGS. 9-12.
Figure 14:
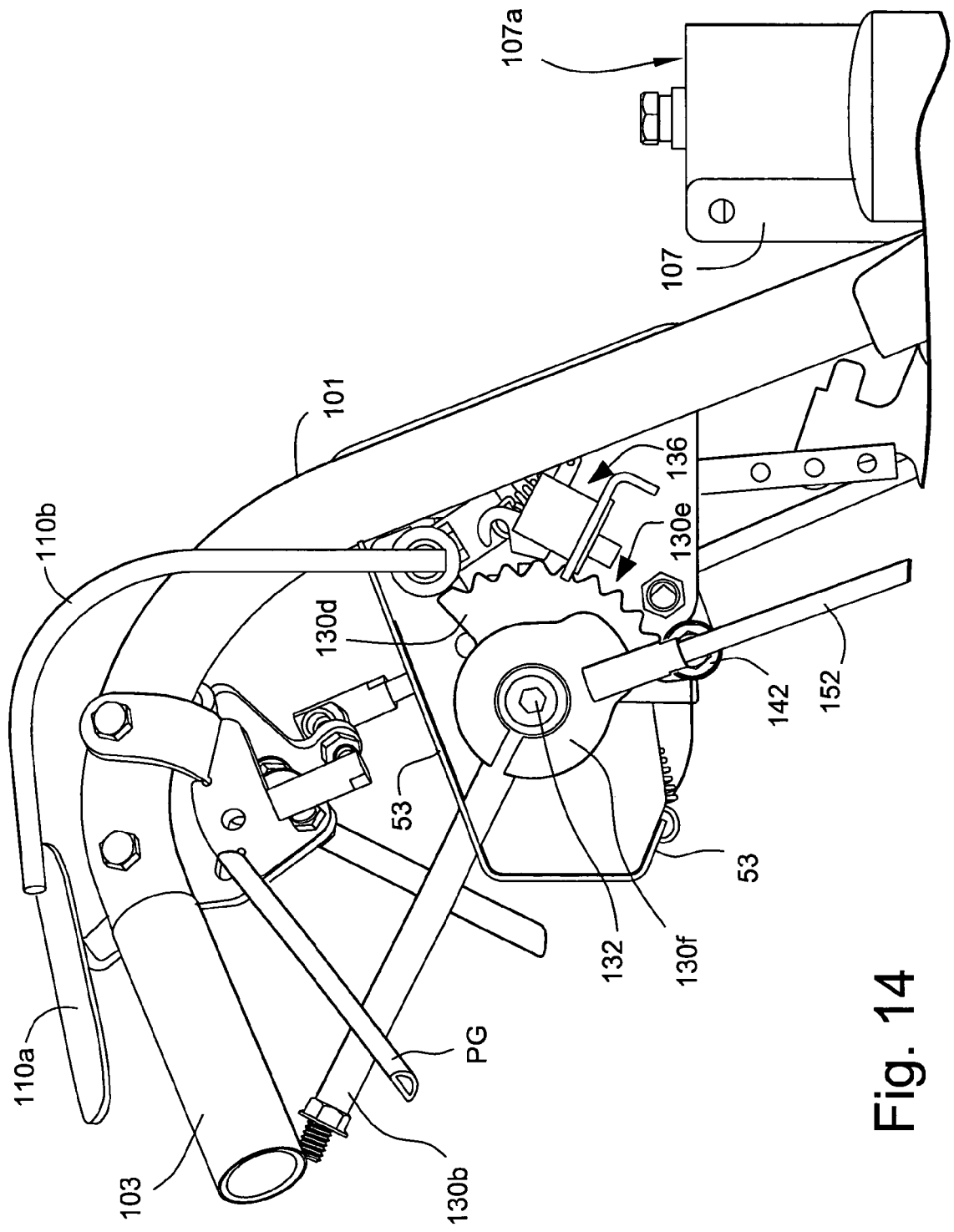
FIG. 14 is a side plan, partially transparent, view from the starboard side of the mower of the speed control system of FIGS. 9-13 (the lever is in a different position than in FIG. 13).
Figure 15:
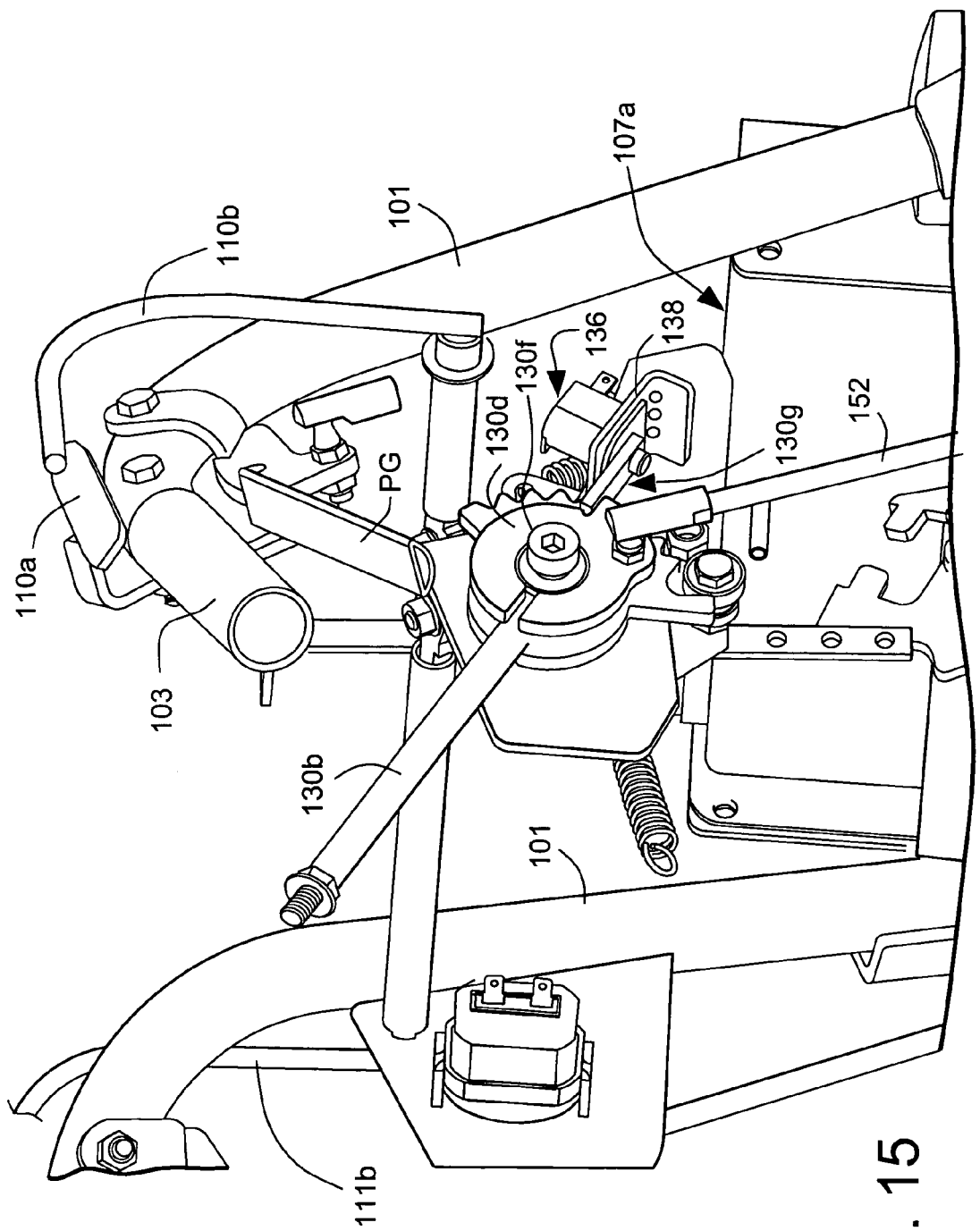
FIG. 15 is a perspective view of the speed control system of FIGS. 9-14.

FIGS. 9-15 illustrate a speed control system according to an example embodiment of this invention. The mower on which this speed control system is provided is the same as the mower of FIGS. 2-8. FIG. 9 is a perspective view of a speed control system of an example embodiment of this invention, in connection with the mower of FIGS. 2-8. FIG. 10 is a perspective view of a speed control system of an example embodiment of this invention (the handle is in a different position than in FIG. 9), in connection with the mower of FIGS. 2-9. FIG. 11 is a perspective view of the lever used in the speed control system of FIGS. 9-10. FIG. 12 is a perspective view of part of the speed control system of FIGS. 9-11. FIG. 13 is a side plan, partially transparent, view from the starboard side of the mower of the speed control system of FIGS. 9-12. FIG. 14 is a side plan, partially transparent, view from the starboard side of the mower of the speed control system of FIGS. 9-13 (the lever is in a different position than in FIG. 13). FIG. 15 is a perspective view of the speed control system of FIGS. 9-14.

Referring to FIGS. 9-15, the speed control lever/detent system includes a bearing biased toward teeth/detents. In particular, an arc-shaped member with teeth 130*e* selectively engages a rolling or ball bearing member 142 that is spring biased by spring 144 into gaps or valleys between the teeth 130*e*. This is particularly useful in walk-behind mowers, such as those with pistol grips shown in the instant figures. The use of the arc-shaped member with teeth that selectively engage a rolling or ball bearing member that is spring biased into gaps or valleys between the teeth is an improvement over friction plate speed control systems because the instant system is more consistent and reliable over the life of the mower. In particular, the user can "feel" the degree of movement of the speed control lever and the control rod that it is controlling, and unexpected speed changes can be reduced and/or eliminated.

Figure 16:
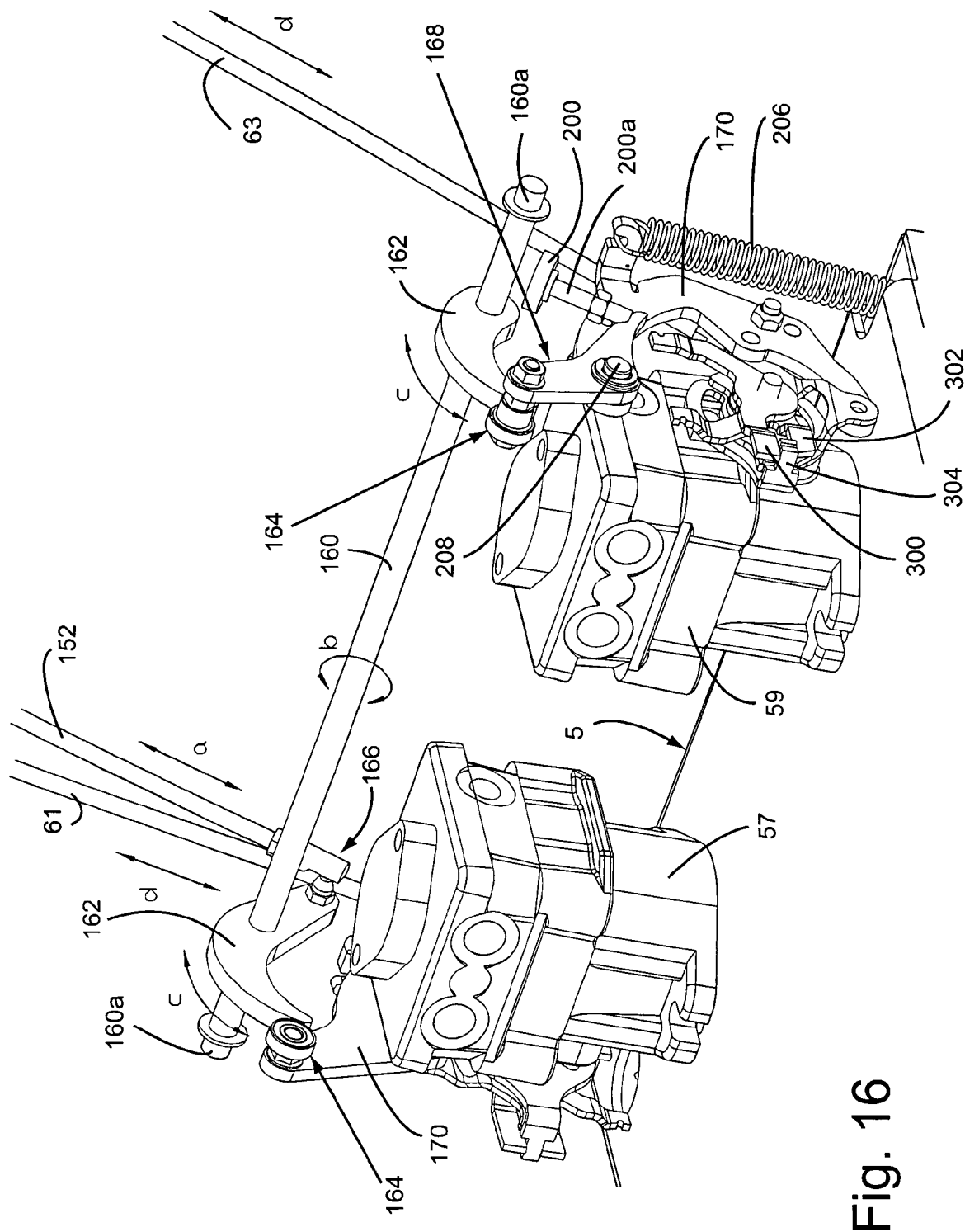
FIG. 16 is a perspective view of a cam bar system of the mower of FIGS. 2-15, according to an example embodiment of this invention.

The speed control system of FIGS. 9-15 (see also FIG. 7 for a front view) includes a weldment or lever 130 which moves in unison as a single unit (see this overall lever in FIG. 11), the lever 130 comprising knob 130*a*, arm 130*b* that moves in slot 131 defined in the dash 53, bushing 130*c* (e.g., bronze flanged type in certain example instances), arc-shaped member 130*d* having teeth 130*e* defined on its arc-shaped surface or edge, and plate 130*f* having a stop 130*g* protruding therefrom and moving therewith (stop 130*g* may or may not be integrally formed with plate 130*f*) (plate 130*f* and plate 130*d* having part of arm 130 provided therebetween and are paced apart from one another). The entire lever structure 130 of FIG. 11 moves together as one unit, as all components thereof are connected to each other, directly or indirectly. When the lever is moved in direction "a" shown in FIGS. 9-10, the lever rotates about an axis defined in the center of the aperture 132. A shoulder screw/nut assembly or the like 134 helps mount the lever on its axis of rotation. The speed control system further includes engine kill switch 136 (e.g., single contact plunger type) including an actuation area or member 136*a*, a kill switch support member 138, pivotal speed control detent arm 140 which pivots/rotates about axis 141 (see pivot/rotation directions "c" in FIG. 12), a bearing or roller 142 supported at a first end of speed control arm 140, extension spring 144 connected to and extending between the other end 140*a* of speed control arm 140 and part of the dash 53, shoulder screw/nut assembly 146, should screw/nut assembly 148, speed control lever support plate 150, and speed control rod 152 that moves in direction "b" when lever is moved in order to increase/decrease mower speed (the speed control rod 152 is pivotally attached to plate 130*f* as shown in FIG. 15 for example). FIG. 16 shows how the speed control rod 152 actuates pumps of the mower in order to control drive wheel speed.

Referring to FIGS. 7 and 9-15, it will be appreciated that when stop 130*g* comes into contact with the actuator of kill switch 136 to a sufficient extent, the kill switch 136 causes the mower's engine and/or blades to stop. FIGS. 10 and 14 show the stop 130*g* pushing in the plunger or button of kill switch 136 so as to cause the mower's engine to stop under certain circumstances (e.g., based on whether the OPC switch is on/off, based on whether the parking brake is on/off, etc.). Thus, when the lever 130*b* is pulled all the way back as shown in FIGS. 10 and 14-15 and the stop 130*g* is thus engaging the actuator of kill switch 136 to a sufficient extent, the mower is in a stopped and/or non-cutting state. Speed is at a maximum when the lever 130*b* is further forward as shown in FIGS. 9 and 13. When the lever 130 is pulled backward, this causes plate 130*f* to rotate counterclockwise as viewed from the starboard side of the mower thereby causing speed control rod 152 to lower thereby causing a decrease in maximum speed of drive wheel(s). Likewise, when the lever 130 is moved forward in slot 131, this causes plate 130*f* to rotate clockwise as viewed from the starboard side of the mower thereby causing speed control rod 152 to rise thereby causing an increase in maximum mower speed. The speed control system may function as a speed limiting system in certain instances. As the arc-shaped surface of member 130*d*, including its teeth 130*e*, is rotated about axis 132 to increase or decrease speed of the mower, bearing or roller 142 stays in approximately the same position but moves into and out of the teeth 130*e* as they pass by. Since the bearing/roller 142 is biased by spring 144 into contact with the teeth 130*e*, the bearing/roller's engagement with the teeth allows a mower operator holding knob 130*a* or lever 130*b* to feel the movement of each tooth across bearing/roller 142. The spring biasing of bearing/roller 142 into engagement with the teeth as shown in the figures causes the member 130*d* and thus lever 130*b* and control rod 152 to stay in place without moving unless enough force is applied to the knob 130*a* or lever 130*b* to overcome the holding power of spring 144 and bearing/roller 142. The spring biasing of bearing/roller 142 prevents the lever 130*b* and member 130*d* from rotating when no one is touching it (even though spring 206 in FIG. 16 for example may be biasing it to move via the cam); thus, this prevents the cam system discussed herein from inadvertently changing the speed control. Moreover, this provides for a more efficient and consistent moving of the lever 130*b* and thus more efficient and easier-to-control speed control.

Figure 17:
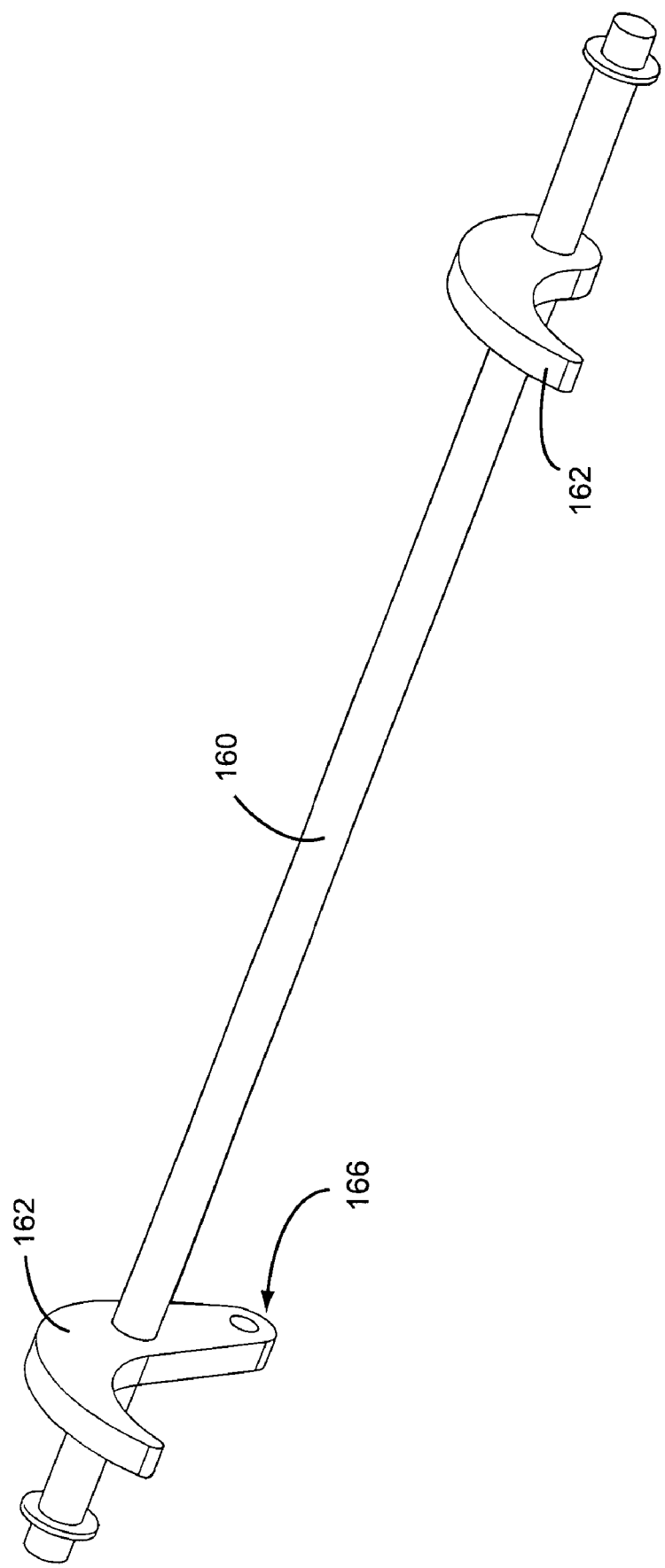
FIG. 17 is a perspective view of the cam shaft and cams of FIG. 16.

FIGS. 16-17 illustrate a cam bar system of the mower of FIGS. 2-15, according to an example embodiment of this invention. Cam bar 160 is mounted between two sidewalls of the mower's frame (not shown in FIGS. 16-17; typically vertically oriented weldments of the frame), and pivots/rotates efficiently in holes defined in the metal frame. Cam bar 160 supports cams 162 which rotate along with the bar 160 (i.e., the cam bar 160 and cams 162 rotate about the bar axis as one unit in unison since they are rigidly connected to each other, directly or indirectly). The cam following rollers/bearings 164 that engage the cams 162 are mounted, directly or indirectly, on respective pump control levers. This results in a highly efficient system. Moreover, the speed control rod 152 of the speed control system is connected via linkage to the cam bar and cams. While the speed control system via rod 152 sets a top maximum speed, the cams 162 can limit speed. The cams 162 may act against rollers/bearings 164 to prevent the hydro pumps from going to full speed. Thus, this functions as a speed limiting device. Moreover, the single speed control rod 152 controls both cams 162 and thus both pumps and the speed of both rear drive wheels.

Referring to FIGS. 16-17, the cam bar speed control/limiting system includes cam bar 160 affixed to cams 162 so as to rotate therewith about the axis of the cam bar, cam following rollers/bearings 164 that engage the cams 162, speed control rod 152 of the speed control/limiting system (see FIGS. 9-15) pivotally connected to one of the cams 162 at location 166, roller support bracket 168 attached to the port side pump, pump control levers 170 connected to both the port and starboard side pumps, hydro pumps 57, 59, pump lever extension springs 206, and steering control rods 61, 63 for controlling the pumps. In certain example embodiments, bracket 168 can be omitted and the rollers/bearings 164 can be provided on pump control levers 170 on both pumps. In the illustrated embodiment, bracket 168 is provided for the port side pump 59 but not the starboard side pump 57 due to the optional tracking adjustment system described at other locations herein. End portions 160*a* of the cam bar fit through apertures in vertical weldments extending up from the engine deck and rotate therein, so that the cams 162 are located inboard of the vertical weldments.

Figure 19:
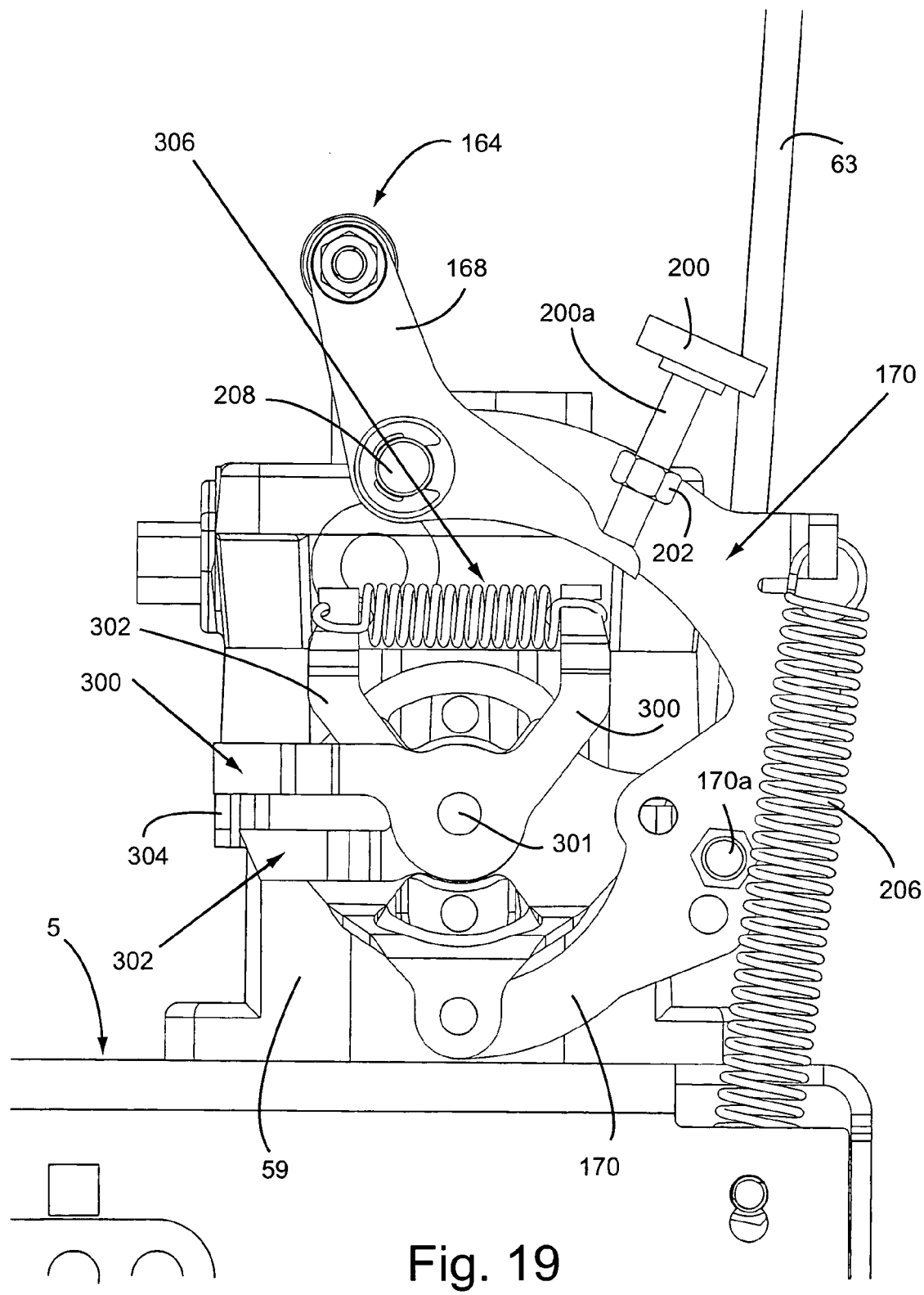
FIG. 19 is plan view from the port side of the mower illustrating components of a return-to-neutral system, tracking control system, and cam bar system of the mower of FIGS. 2-18 according to an example embodiment of this invention (the pump control lever is in a "neutral" position which is a different position than in FIG. 18).
Figure 20:
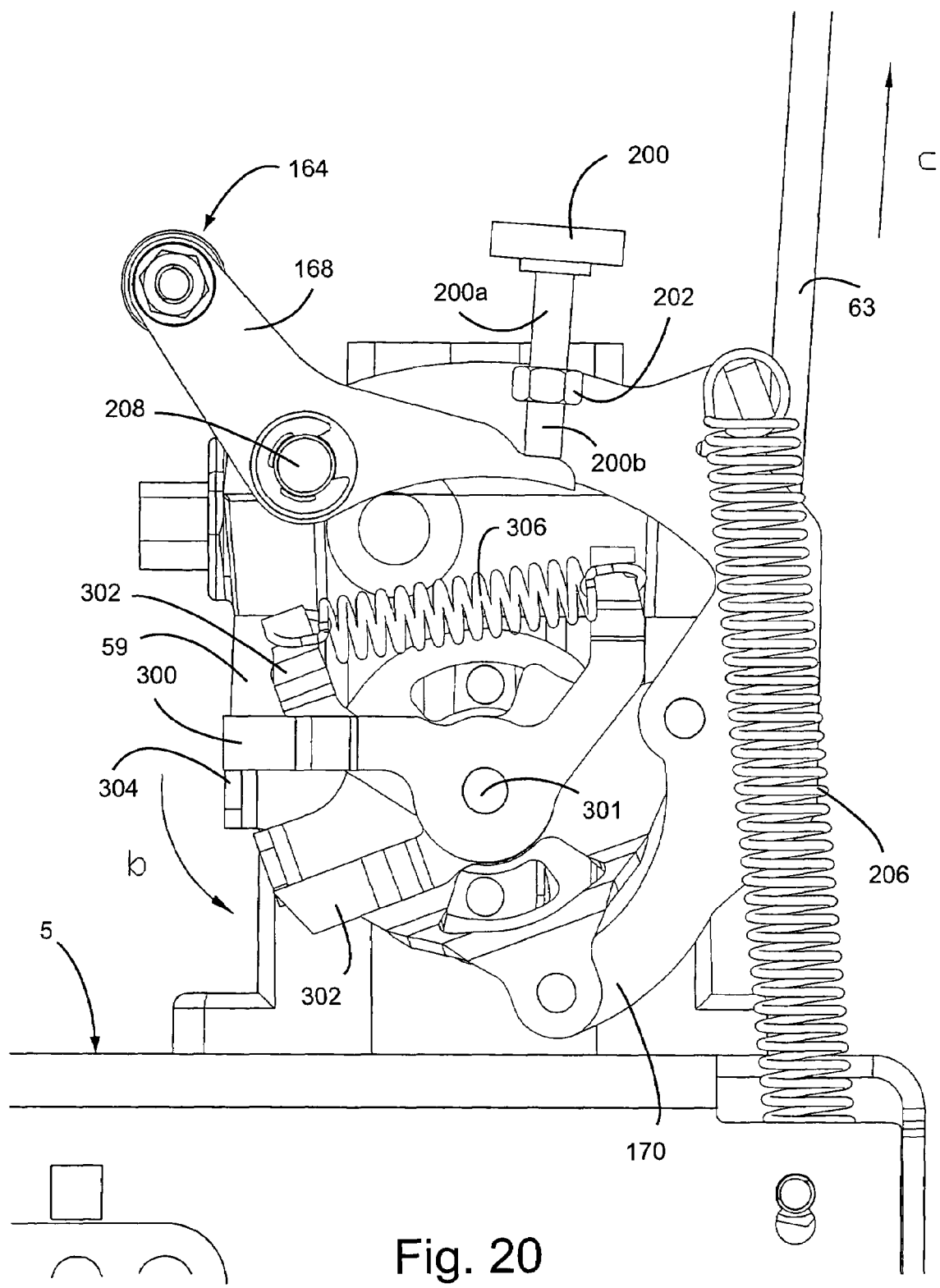
FIG. 20 is plan view from the port side of the mower illustrating components of a return-to-neutral system, tracking control system, and cam bar system of the mower of FIGS. 2-18 according to an example embodiment of this invention (the pump control lever is in a "reverse" position which is a different position than in FIGS. 18-19).
Figure 21:
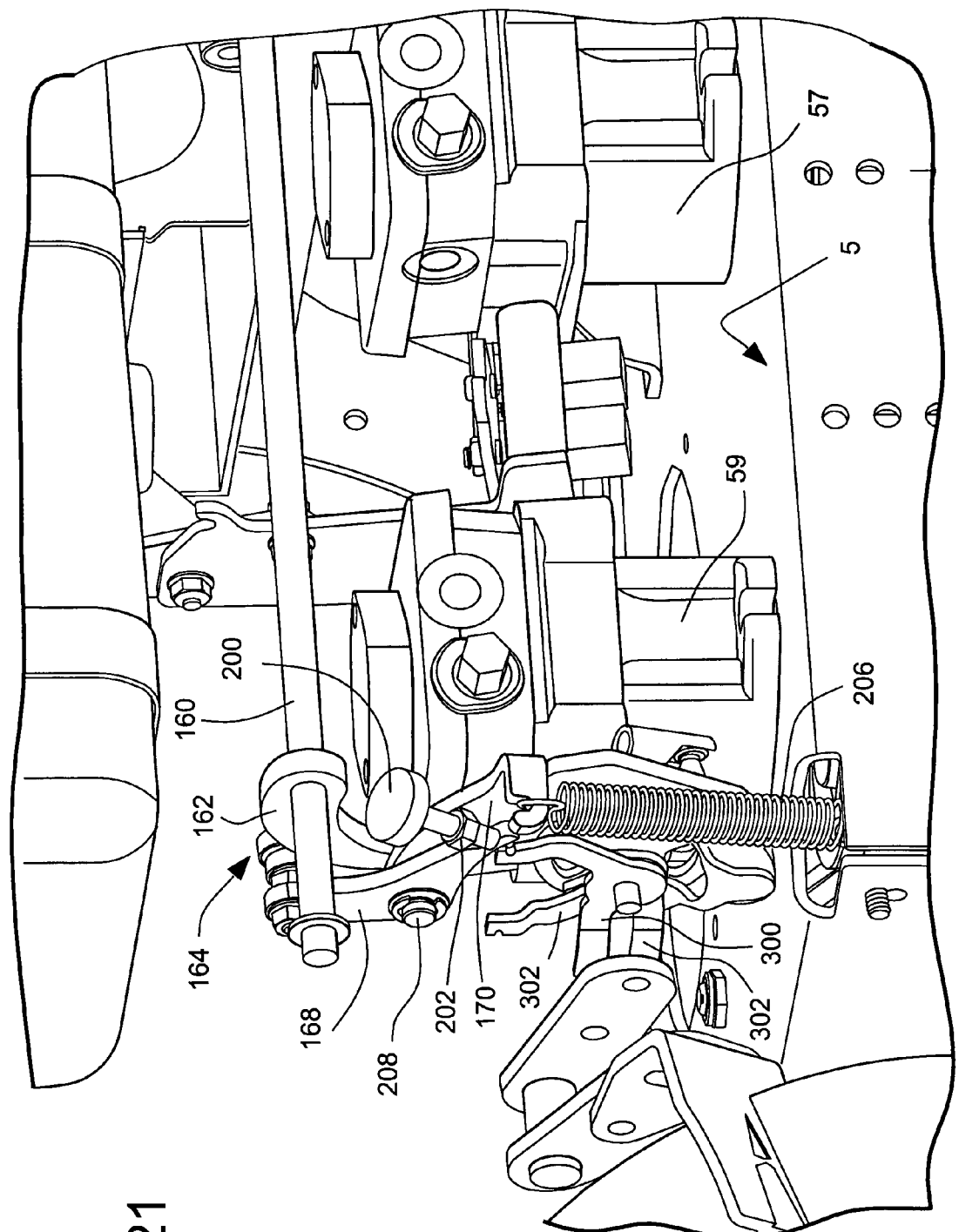
FIG. 21 is a perspective view of components of the return-to-neutral system, tracking control system, and cam bar system of the mower of FIGS. 2-20.

Referring to FIGS. 16-21, springs 206 cause levers 170 (and bracket 168) and thus rollers/bearings 164 to be biased toward and contact cams 162 when the mower is moving in a forward direction. The operator via the handle controls can control (raise/lower) control rods 61 and 63 which in turn cause pump control levers 170 to pivot and thus control the respective hydraulic (hydro) pumps 57, 59. The speed and direction (forward, reverse or neutral) of the corresponding drive wheels may be controlled in such a manner (each pump controls the speed and direction of a corresponding drive wheel of the mower). However, as best shown in FIGS. 16 and 21, cams 162 limit the movement of pump control levers 170 in one direction. In particular, cams 162 engage rollers/bearings 164 and thus prevent the pump control levers 170 (and bracket 168 on the port side pump) which support the rollers/bearings 164 from moving any further clockwise as viewed from the port side of the mower. Thus, the cams act as speed limiters. The positions of the cams 162 (and thus the maximum speed that the drive wheels may be driven) may be adjusted by speed control rod 152 which is attached to one of the cams 162 via linkage (both cams 162 and the cam bar 160 rotate together in direction "b"). In particular, if rod 152 moves vertically downward (via speed control lever 130) (see direction "a" in FIG. 16), this causes cam bar or shaft 160 to rotate clockwise (as viewed from the port side of the mower) about the axis (see direction "b" in FIG. 16) defined by the bar/shaft 160 and thus causes cams 162 to move clockwise in direction "c" shown in FIG. 16, which in turn pushes rollers/bearings 164 to the left (as viewed from the port side of the mower) thereby reducing maximum speed of the mower or reducing the speed of the mower. This is an example of how the cam bar system may be used to adjust speed or limit speed of the mower according to an example embodiment of this invention.

Figure 22:
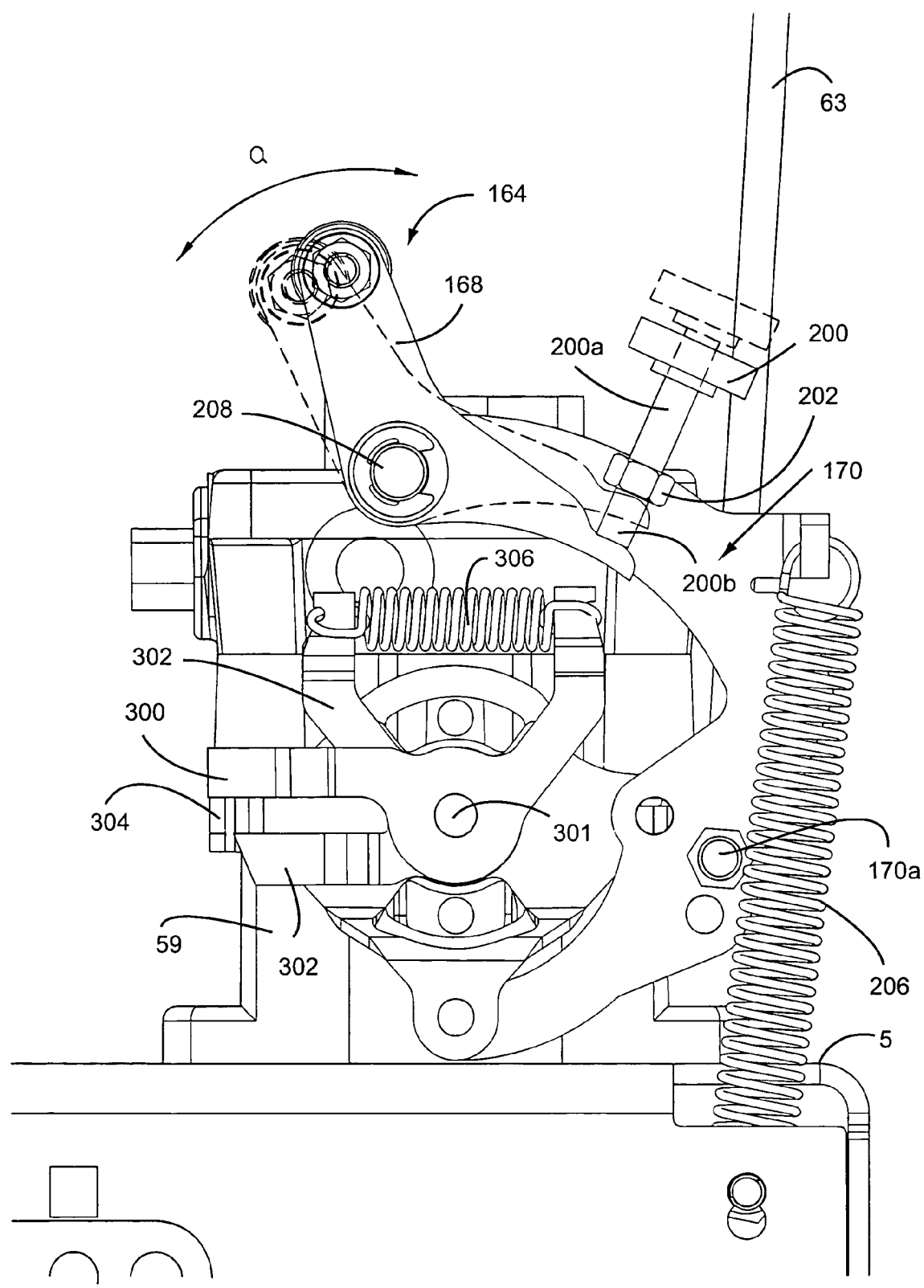
FIG. 22 is plan view from the port side of the mower illustrating components of a return-to-neutral system, tracking control system, and cam bar system of the mower of FIGS. 2-21 according to an example embodiment of this invention, this figure illustrating in dotted/solid lines different positions of the adjustment knob and roller/bearing of the tracking adjustment system.
Figure 23:
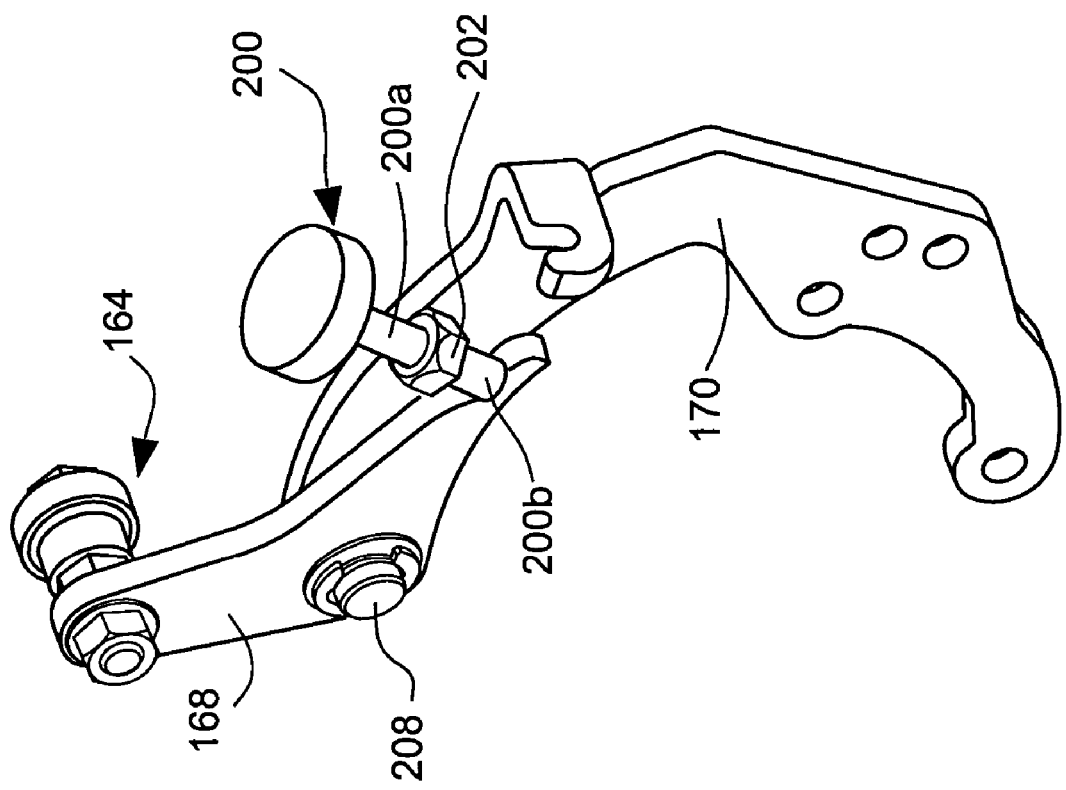
FIG. 23 is a perspective enlarged view of the pump control lever, tracking control roller support bracket, roller/bearing, and tracking control adjustment knob/lever of the mower of FIGS. 2-22, according to an example embodiment of this invention.

FIGS. 21-23 (and see also FIGS. 16-20) illustrate a tracking adjustment system according to an example embodiment of this invention. The tracking adjustment system may be used to, for example, make sure that when the mower is moving full maximum speed forward that the two drive wheels are being driven at about the same speed so that the mower tracks forward in an approximate straight line (as opposed to veering off to the right or left). The tracking adjustment system includes tracking adjustment knob 200 including threaded shaft 200a and distal end 200b of the shaft, threaded nut 202 affixed (e.g., welded or tapped) to pump control lever 170, tracking control roller support bracket 168, cam bar 160 affixed to cams 162 so as to rotate therewith about the axis of the cam bar, cam following rollers/bearings 164 that engage the cams 162, pump lever extension springs 206 that resist extension (springs 206 extend between the frame of the mower and a rear portion of pump control lever 170 so as to bias the lever 170 about its pivot axis), speed control rod 152 of the speed control/limiting system (see FIGS. 9-15) pivotally connected to one of the cams 162 at location 166, pump control levers 170 connected to both the port and starboard side pumps, hydro pumps 57, 59, and steering control rods 61, 63 for controlling the pumps. A spring (not shown) may be provided between the bottom side of knob 200 and the top of nut 202. The distal end 200b of the knob shaft 200a contacts a surface of bracket 168 so as to permit the position of bracket 168 (and thus roller/bearing 164 supported thereby) to be adjusted by adjusting the position of shaft 200a in nut 202. Tracking adjustment components 200, 200a, 202 and 168 may be provided only on one side of the mower (e.g., for the port side pump only, and not the starboard side pump as in the illustrated embodiment) in certain example embodiments of this invention. The tracking adjustment system may be on either the right or left side of the mower, or on both sides, in different embodiments of this invention.

Still referring to the tracking adjustment system (e.g., see FIGS. 16-23, and especially FIGS. 21-23), in walk-behind mowers it will be appreciated that the pump control levers 170 are typically biased by springs 206 toward maximum allowable forward speed (i.e., levers 170 are biased clockwise about their pivot axes as viewed from the port side of the mower as shown in FIGS. 16, 18-22). This biasing by springs 206 causes the rollers/bearings 164 that are supported, directly or indirectly, by pump control levers 170 to be biased into contact with cams 162 so as to set the maximum speed for each drive wheel of the mower. For the port side pump, pump control lever 170 and tracking control roller support bracket 168 are pivotally attached to one another about pivot axis 208. Rotation of knob 200 causes threaded shaft 200a to rotate in fixed nut 202 thereby causing the distal end 200b of shaft 200a to change positions relative to the nut 202. Since distal end 200b of the knob shaft 200a contacts a surface of bracket 168, when knob 200 is rotated this changes the position of both the distal end 200b of the shaft and the position of the right-hand end of bracket 168 relative to both the nut 202 and the pump control lever 170. This permits the position of bracket 168 (and thus roller/bearing 164 supported thereby) to be adjusted relative to the pump control lever 170 by adjusting the position of shaft 200a in nut 202. See the adjustment direction "a" of roller/bearing 164 in FIG. 22. In FIG. 22, the roller/bearing 164 is in the dotted line position when the knob 200 is in its dotted line position; and roller/bearing 164 is in the solid line position when the knob 200 is in its solid line position. For example, if roller/bearing 164 is adjusted to a position further away from cam 162, then the pump control lever 170 can pivot more and allow pump 59 to operate faster in a forward direction for example. This permits the left drive wheel's maximum speed (typical speed) to be adjusted relative to the right drive wheel's maximum speed, thereby permitting tracking adjustment of the mower's drive wheels.

Figure 18:
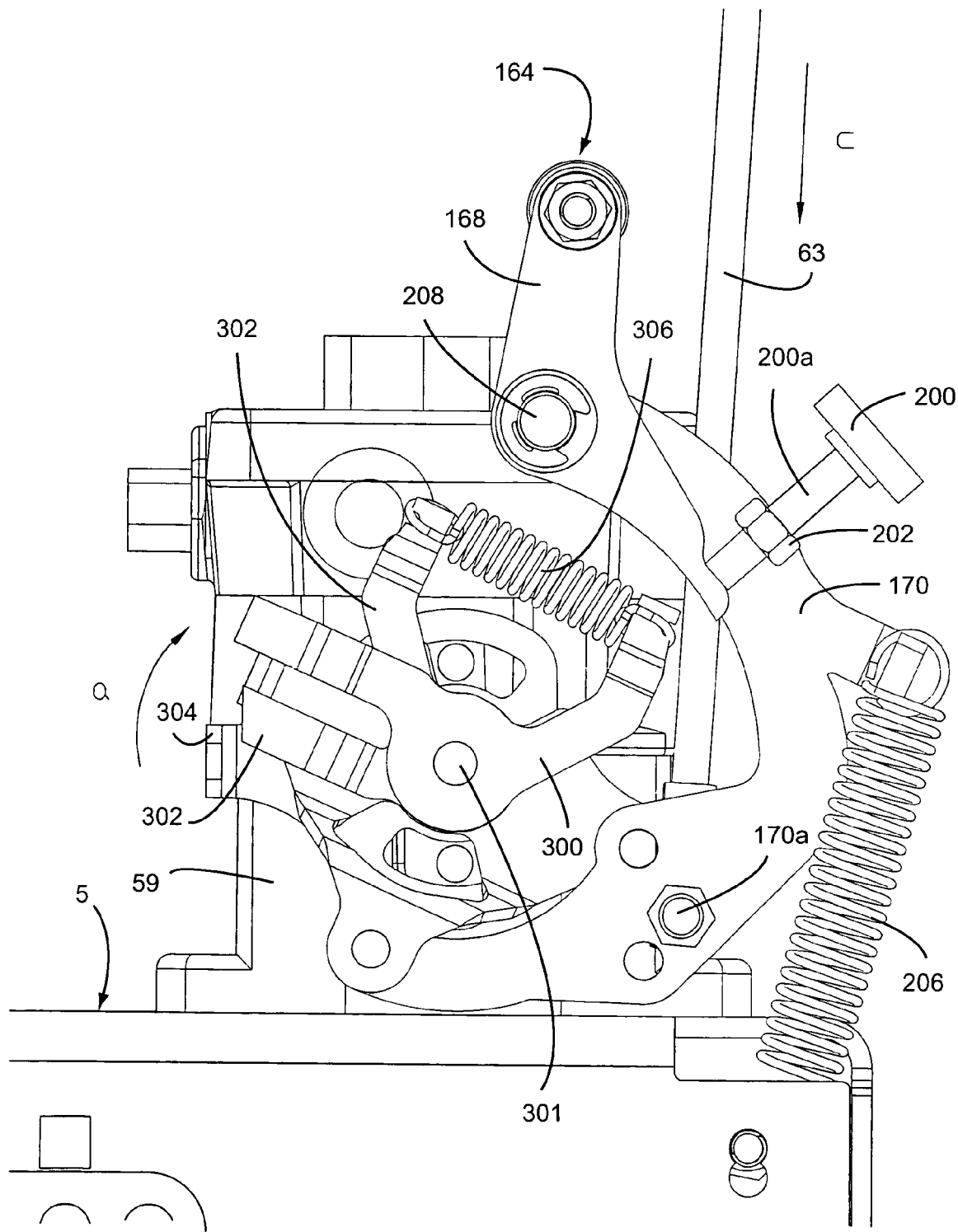
FIG. 18 is plan view from the port side of the mower illustrating components of a return-to-neutral system, tracking control system, and cam bar system of the mower of FIGS. 2-17 according to an example embodiment of this invention (the pump control lever is in a "forward" position in this figure).

FIGS. 18-21 (see also FIGS. 3, 7, 15-17, and 22-23) illustrate a return-to-neutral (RTN) system of the pistol-grip walk-behind mower of FIGS. 2-23 according to an example embodiment of this invention. The return to neutral system is present for each of the two hydro pumps, and includes for each pump: a pump control lever 170, hydro pump (57, 59), exterior return-to-neutral (RTN) arm 300, interior RTN arm 302, pump actuator 304, RTN extension spring 306 that resists extension that is provided between and attached to an end portion of the exterior RTN arm and an end portion of the interior RTN arm 302, pump lever extension spring 206, and steering control rod (61, 63). These components are typically mounted on the tractor body such as the engine deck 5. It can be seen that the arms 300, 302 rotate about axis 301. Example hydraulic pumps are described in U.S. Pat. No. 6,782,797, the disclose of which is hereby incorporated herein by reference. The control rod is attached to the pump control lever 170 at pivot point 170a. The parts discussed herein, other than the tires, are typically made of suitable metal. FIG. 18 illustrates pump 59 (and components 170, 300, 302) in the "forward" position meaning that the corresponding drive wheel of the mower will be driven forward by the pump and corresponding wheel motor when the pump is in this position; FIG. 19 illustrates pump 59 (and components 170, 300, 302) in the "neutral" position; and FIG. 20 illustrates pump 59 (and components 170, 300, 302) in the "reverse" position.

Conventional pistol grips of walk-behind mowers are always biased toward full speed ahead—which means that the pivotal pistol grips (PGs) (see PG levers in FIGS. 3, 7, 15) are biased to the open position. To stop or slow down the mower, the operator squeezes on the PGs (PG levers) until the corresponding pumps hit neutral at about a half-way point to the rigid handle of the mower. If the operator keeps squeezing the PGs, the pumps pass through neutral and enter reverse and the mower begins to go in reverse until the PGs finally hit the rigid hand grip bar 103. Thus, the conventional walk-behind art teaches to always bias PGs to full throttle or full speed in the forward direction.

In certain example RTN embodiments of this invention, a pistol-grip type walk behind mower is provided that uses a RTN system which flies in the face of conventional walk-behind teachings. In particular, the RTN system of the walk-behind mower of FIGS. 2-23 biases the pump arms/lever toward neutral but in a manner such that the RTN bias is only effective from reverse toward neutral for the PGs (not from forward toward neutral). Thus, when an operator squeezes on the PGs, this extra bias comes into play and is felt by the hand(s) of the operator after the operator squeezes the PG(s) past the neutral position and into the reverse position of the pump. The RTN system gives extra bias from reverse to neutral, thereby alerting the operator during the PG squeezing process to hitting neutral and proceeding into reverse. This RTN system alerts the operator to where "reverse" and "neutral" are with respect to the squeezing of the PG levers. Moreover, this is further advantageous in that it optionally permits one to eliminate or reduce the need for mechanical linkage for alerting an operator to hitting neutral.

Referring to FIGS. 3, 7, 15-23, the RTN system operates as follows in the pistol-grip (PG) walk-behind mower. If the operator is not squeezing the PGs of the handle assembly, the PG levers are spring biased by pump control lever springs 206 (via components 170, 170a, 63, 61) into the full open or maximum forward position where the PGs are biased away from the hand grips 103 to the positions shown in FIGS. 3, 7 and 15 (note that the control rods 61, 63 are not shown in FIGS. 7 and 15 for purposes of simplicity). In this position of the PGs shown in FIGS. 3, 7, and 15, the pumps 57, 59 are in the maximum "forward" state as shown in FIG. 18, and the rear drive wheels 9, 11 are thus driven in a forward direction. FIG. 18 illustrates that when the pump is in the "forward" state as biased by spring 206, the exterior RTN arm 300 and the interior RTN arm have both rotated about axis 301 in direction "a" past stop 304. Thus, when the pump is in the forward state, RTN spring 306 does not bias the pump back toward neutral. From the forward state, when the operator begins to squeeze the PGs toward the hand grips 103, this squeezing is performed against the bias from pump control lever springs 206. Thus, when the operator squeezes the PGs toward the hand grips and thus toward the "neutral" state, the operator feels the bias of the springs 206. When the PGs are squeezed to a position about half-way to the hand grips 103, the pump control lever 170 along with RTN arms 300, 302 have been rotated or pivoted from the FIG. 18 position to the FIG. 19 "neutral" position so that the pumps enter the "neutral" state and the drive wheels are not driven. The pump is in the "neutral" state when the exterior RTN arm 300 hits stop 304 as shown in FIG. 19. Note that interior RTN arm 302 is too short to hit actuator 304 and thus passes by it without being stopped when the arm 302 is rotating about axis 301. In both the forward and neutral states, RTN arms 300 and 302 are the same limited distance apart (see FIGS. 18 and 19) so that spring 306 does not perform any RTN biasing effect when the pumps are in the forward or neutral positions. The interior/exterior arms may be reversed in certain situations, and may be different on the right and left pumps in certain example instances.

However, if the operator continues to squeeze the PGs past neutral so as to cause the pumps to enter "reverse" (and thus the wheels to be driven in reverse), the actuator 304 prevents arm 300 from rotating further counterclockwise but arm 302 does rotate further counterclockwise and thus further away from arm 300 as shown in FIG. 20. FIG. 20 illustrates the pump 59 in "reverse." Accordingly, RTN spring 306 becomes stretched, and since the spring resists extension it biases interior arm 302 clockwise toward neutral when the pump is in the reverse state as shown in FIG. 20. Thus, once the pump enters reverse, additional biasing toward neutral is provided by RTN spring 306 as shown in FIG. 20. An operator holding or squeezing the PGs when the pumps are in "reverse" is thus holding or squeezing the PGs against both the bias of spring 206 and the bias of RTN spring 306, with the added bias of RTN spring 306 alerting the operator to where the interface between neutral and reverse is in the PG squeezing process. Once the pump returns to the "neutral" state shown in FIG. 19, RTN spring 306 no longer provides additional biasing. Thus, the RTN bias of spring 306 is only effective from reverse toward neutral for the PGs (not from forward toward neutral); although the bias from spring 206 is present throughout the entire PG squeezing process. Thus, when an operator squeezes on the PGs, this extra bias from RTN spring 306 comes into play and is felt by the hand(s) of the operator after the operator squeezes the PG(s) past the neutral position and into the reverse position of the pump. The RTN system gives extra bias from reverse to neutral, thereby alerting the operator during the PG squeezing process to hitting neutral and proceeding into reverse so as to allow the operator to easily identify and feel the interface between reverse and neutral.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A lawn mower comprising:
an engine for driving at least one cutting blade;
a handle bar assembly including at least two spaced apart handles for an operator to grip during operation of the mower;
an operator presence control (OPC) system including a right-hand lever and a left-hand lever, wherein the OPC system allows the mower to cut grass when a hand-grip portion of the right and/or left hand lever is pressed against a handle(s) of the mower, but causes the mower to stop cutting grass when the hand-grip portions of the right and left-hand levers are not pressed against the handles of the mower;
wherein the right and left hand levers of the OPC system are made separately and are connected together by at least one bracket under a dash of the mower; and
wherein each of the right and left-hand levers is bolted or screwed to the bracket under the dash of the mower, and wherein a portion of the bracket selectively pivots along with the levers for engaging a button of an OPC switch of the OPC system.

2. The mower of claim 1, wherein the portions of the right and left-hand levers that are positioned under the dash of the mower are small enough in size to fit through respective apertures defined in respective vertically oriented sidewalls of the dash.

3. The mower of claim 1, wherein one of the right and left-hand levers of the OPC system has a male portion at an end portion thereof, and the other of the right and left-hand levers has a female portion at an end portion thereof, and wherein the male and female portions engage one another under the dash of the mower.

4. The mower of claim 1, wherein a spring of the OPC system is connected to the bracket for biasing at least part of the bracket away from a button of an OPC switch of the OPC system.

5. The mower of claim 1, wherein the bracket is approximately L-shaped when viewed from at least one direction.

6. The mower of claim 1, wherein the handles of the mower are tubular, and wherein the tubular handles are welded or bolted to respective vertically extending plates which extend upwardly from a frame of the mower.

7. The mower of claim 1, wherein the right and left hand levers of the OPC system are directly connected to each other.

8. A lawn mower comprising:
an engine for driving at least one cutting blade;
a handle bar assembly including at least two spaced apart handles for an operator to grip during operation of the mower;
an operator presence control (OPC) system including a right-hand lever and a left-hand lever, wherein the OPC system allows the mower to cut grass when a hand-grip portion of the right and/or left hand lever is pressed against a handle(s) of the mower, but causes the mower to stop cutting grass when the hand-grip portions of the right and left-hand levers are not pressed against the handles of the mower;

wherein the right and left hand levers of the OPC system are made separately and are connected together by at least one bracket under a dash of the mower; and wherein one of the right and left-hand levers of the OPC system has a male portion at an end portion thereof, and the other of the right and left-hand levers has a female portion at an end portion thereof, and wherein the male and female portions engage one another under the dash of the mower; and wherein the male and female portions are bolted to the bracket.

* * * * *